United States Patent
Nomura et al.

(10) Patent No.: US 7,688,352 B2
(45) Date of Patent: Mar. 30, 2010

(54) SHAKE CORRECTION DEVICE, FILMING DEVICE, MOVING IMAGE DISPLAY DEVICE, SHAKE CORRECTION METHOD AND RECORDING MEDIUM

(75) Inventors: Kazuo Nomura, Suwa (JP); Megumi Sano, Suwa (JP); Michihiro Nagaishi, Suwa (JP); Tatsuya Hosoda, Suwa (JP)

(73) Assignee: Seiko Epson Corporation (JP)

( * ) Notice: Subject to any disclaimer, the term of this patent is extended or adjusted under 35 U.S.C. 154(b) by 633 days.

(21) Appl. No.: 11/562,596

(22) Filed: Nov. 22, 2006

(65) Prior Publication Data

US 2007/0140674 A1  Jun. 21, 2007

(30) Foreign Application Priority Data

Nov. 25, 2005 (JP) ............................. 2005-339723
Nov. 25, 2005 (JP) ............................. 2005-339724

(51) Int. Cl.
*H04N 5/228* (2006.01)
(52) U.S. Cl. ..................... 348/208.11; 348/208.99; 348/208.2
(58) Field of Classification Search ................ 348/208.99–208.16
See application file for complete search history.

(56) References Cited

U.S. PATENT DOCUMENTS

| | | | | |
|---|---|---|---|---|
| 5,237,365 A | * | 8/1993 | Miyazawa | .............. 396/49 |
| 5,585,875 A | * | 12/1996 | Imafuji et al. | .............. 396/55 |
| 6,784,927 B1 | * | 8/2004 | Itokawa | .............. 348/208.1 |
| 7,057,645 B1 | * | 6/2006 | Hara et al. | .............. 348/208.6 |
| 7,319,438 B2 | * | 1/2008 | Marino et al. | .............. 345/8 |
| 2002/0039138 A1 | * | 4/2002 | Edelson et al. | .............. 348/208 |
| 2004/0061796 A1 | * | 4/2004 | Honda et al. | .............. 348/297 |
| 2005/0057662 A1 | * | 3/2005 | Washisu | .............. 348/208.99 |
| 2005/0088532 A1 | * | 4/2005 | Nomura | .............. 348/208.6 |
| 2005/0219374 A1 | * | 10/2005 | Uenaka | .............. 348/208.12 |
| 2005/0248662 A1 | * | 11/2005 | Yamazaki | .............. 348/208.99 |
| 2006/0215036 A1 | * | 9/2006 | Chung et al. | .............. 348/208.4 |

FOREIGN PATENT DOCUMENTS

| | | |
|---|---|---|
| JP | 01-125064 | 5/1989 |
| JP | 08-320511 | 12/1996 |

* cited by examiner

*Primary Examiner*—Sinh Tran
*Assistant Examiner*—Christopher K Peterson
(74) *Attorney, Agent, or Firm*—Harness, Dickey & Pierce, P.L.C.

(57) ABSTRACT

A filming device includes a filming unit which imports a plurality of frames configuring a moving image at a prescribed sampling rate, a shake amount detection unit which detects a shake amount of each of the frames, a frame position calculation unit which calculates a frame position of each frame based on the shake amount, a reference frame position determination unit which determines a reference frame position to be a reference of a display subject frame, and a frame selection and transmission unit which selects and sequentially transmits frames positioned within a prescribed range centered on the reference frame position.

3 Claims, 13 Drawing Sheets

| HAND SHAKE TENDENCY | FRAME SELECTION ALGORITHM | CORRECTION EFFECT |
|---|---|---|
| HAND SHAKE TENDENCY 105A | ALGORITHM 110A | LARGE ↑↓ SMALL |
| HAND SHAKE TENDENCY 105B | ALGORITHM 110B | |
| HAND SHAKE TENDENCY 105C | ALGORITHM 110C | |
| HAND SHAKE TENDENCY 105D | ALGORITHM 110D | |
| HAND SHAKE TENDENCY 105E | ALGORITHM 110E | |
| HAND SHAKE TENDENCY 105F | ALGORITHM 110F | |
| OTHER THAN THE ABOVE | ALGORITHM 110G | |

FIG.12

SHAKE CORRECTION DEVICE, FILMING DEVICE, MOVING IMAGE DISPLAY DEVICE, SHAKE CORRECTION METHOD AND RECORDING MEDIUM

BACKGROUND

1. Technical Field

The present invention relates to a technique for correcting the unsteadiness or shaking of a moving image filmed by hand through a portable video camera or the like.

2. Description of the Related Art

A hand shake correction function for correcting hand shake in a filming device such as a portable digital video camera or a digital camera with a moving image filming function is known. In addition to importing frames at a prescribed sampling rate, this type of filming device, clips images of a display subject area of a fixed area from each frame and sequentially displays them. When the filming device corrects the hand shake, it calculates, for every frame, a direction and a size of a shake of an image caused by the hand shake as a hand shake amount, and relatively moves the display subject area within the frame based on the hand shake amount, so that the display subject area is fixed regardless of the hand shake. As a result, as the filming device constantly clips the images of the constantly positioned display subject area from each frame, by sequentially displaying the images, a moving image display with no hand shake is realized (see, for example, JP-A-1-125064).

Also, in a camera which films a motionless image, a shake reduction camera which has a shake detector such as, for example, an acceleration sensor, and reduces a reduction in image quality due to a distortion of images using detected shake information, has been known. In this type of shake reduction camera, one has been known which, by predicting the shake based on the shake information and starting an exposure at a time when the shake decreases, enables capturing an image with no shake (see, for example, JP-A-8-320511). Consequently, at a time of a moving image reproduction display, a moving image display with no shake is also enabled by predicting the shake of the frames, and selecting and displaying only frames in which the shake decreases.

However, there is a problem in that, at the time of the moving image reproduction display, it is necessary to carry out a hand shake amount calculation process, a display subject area movement process and a display subject area extraction process, or a shake prediction process, for every frame. Consequently, in the event that the frame sampling rate when filming is high, it is necessary for the filming device to include a sophisticated and high-speed processor in order to carry but all of the processes for every frame at the time of the moving image reproduction display, the cost of the device increases.

SUMMARY

An object of the invention is to provide a shake correction device, a filming device, a moving image display device, a shake correction method and a recording medium which can correct a shake, by a simple process, even in the event that a frame sampling rate is high.

In order to achieve the object, a shake correction device is provided including: a shake amount detection unit which detects a shake amount of each of a plurality of frames configuring a moving image; a frame position calculation unit which calculates a frame position of each frame based on the shake-amount; a reference frame position determination unit which determines a reference frame position to be a reference of a display subject frame; and a frame selection and transmission unit which selects and sequentially transmits frames positioned within a prescribed range centered on the reference frame position.

Accordingly, only the frames positioned within the prescribed range centered on the reference frame position are sequentially transmitted. Consequently, as only the frames positioned within a prescribed range centered on a reference frame are displayed when displaying the frames, a moving image display with suppressed shake results. Furthermore, a display subject area movement process and a display subject area extraction process for each frame, as in a heretofore known technology, are unnecessary, even in the event that the sampling rate of the frames is high. Therefore, it is possible to sufficiently correct the shake by a simple process, without a process amount greatly increasing.

As a destination to which the frame selection and transmission unit transmits the frames, a display unit such as, for example, an external display or a built-in display, can be used.

In the shake correction device, it is acceptable to have a configuration in which the reference frame position determination unit makes a frame position of a leading frame, of the frames configuring the moving image, the reference frame position.

According to the configuration, as the frame position in which the user first filmed the subject is made the reference frame position, it is possible to display only the frames filmed centered on the subject as the moving image.

In the shake correction device, it is acceptable to have a configuration in which the reference frame position determination unit updates the reference frame position every time a prescribed time elapses from a display time of the leading frame, or every prescribed number of frames from the leading frame.

According to the configuration, as the reference frame position is updated every time the prescribed time elapses, even in the event that filming is carried out over a comparatively long time, and a user carries out camerawork such as panning during the filming, the reference frame position is changed tracking the camerawork. As a result, a moving image which reflects the user's camerawork can be displayed with the shake suppressed.

In the shake correction device, it is acceptable to have a configuration in which the reference frame position determination unit, when updating the reference frame position, makes a position in which a frame position of each frame lying within the prescribed time, or a frame position of each frame belonging to the prescribed number of frames, is concentrated the reference frame position.

According to the configuration, as the position in which the frame positions are concentrated, that is, a place which the user is attempting to film, is made the reference frame position, and the frames centered on the reference frame position are displayed as the moving image, a moving image display centered on a filming position which the user desires is possible.

In the shake correction device, it is acceptable to have a configuration in which the frame selection and transmission unit, in the event that a display time between frames to be selected exceeds a prescribed time, or in the event that a number of frames between the frames to be selected exceeds a prescribed number, inserts a frame between the frames, regardless of a frame position, and transmits it.

According to the configuration, as the next frame is always displayed within a certain time from the previous frame being displayed, even in the event that the hand shake is extreme and the frame position does not come within the prescribed range, there is no likelihood of the display time of one frame becoming abnormally long, and a smooth moving image reproduction is possible.

In the shake correction device, it is acceptable to have a configuration in which the device includes: a tolerance range setting unit which, based on a shake tolerance range tolerated as a frame used in a moving image display, sets an angular velocity tolerance range corresponding to the relevant shake tolerance range as the prescribed range, wherein the shake amount detection unit detects an angular velocity indicating the shake amount for every frame, and the frame selection and transmission unit selects and sequentially transmits frames of which the angular velocity is within the angular velocity tolerance range.

According to the configuration, since the frames with no shake are selected simply by comparing the angular velocity of the frame and the angular velocity tolerance range, it is possible to quickly and easily configure the moving image with only frames with no shake.

Also, in order to achieve the heretofore described object, a filming device is provided, including: a filming unit which imports a plurality of frames configuring a moving image at a prescribed sampling rate; a shake amount detection unit which detects a shake amount of each of the frames; a frame position calculation unit which calculates a frame position of each frame based on the shake amount; a reference frame position determination unit which determines a reference frame position to be a reference of a display subject frame; and a frame selection and transmission unit which selects and sequentially transmits frames positioned within a prescribed range centered on the reference frame position.

In the filming device, it is acceptable to have a configuration in which the shake amount detection unit includes: a velocity detector which detects an acceleration or an angular velocity occurring in a device main body, in synchronization with the importing of the frames, and detects the shake amount based on the acceleration or the angular velocity.

In the filming device, it is acceptable to have a configuration in which the device includes: a tolerance range setting unit which, based on a shake tolerance range tolerated as a frame used in a moving image display, sets an angular velocity tolerance range corresponding to the relevant shake tolerance range as the prescribed range, wherein the shake amount detection unit detects an angular velocity indicating the shake amount for every frame, and the frame selection and transmission unit selects and sequentially transmits frames having an angular velocity within the angular velocity tolerance range.

According to the configuration, since the frames with no shake are selected simply by comparing the angular velocity of the frame and the angular velocity tolerance range, it is possible to quickly and easily select and display only the frames with no shake.

In the filming device, it is acceptable to have a configuration in which the tolerance range setting unit changes the angular velocity tolerance range in accordance with a focal distance of the filming unit.

According to the configuration, as the angular velocity tolerance range is changed in accordance with the focal distance (a focusing) of the filming unit, even in the event that, for example, the user changes a zoom when filming, at the time the moving image is displayed, only frames which are appropriate to the zoom, and which have no shake, are accurately selected.

In the filming device, it is acceptable to have a configuration in which the device includes: an angular velocity sampling unit which, prior to the importing of the frames by the filming unit, samples the angular velocity detected by the shake amount detection unit for a prescribed time; and a tolerance range change unit which changes the angular velocity tolerance range based on the sampled angular velocity.

According to the configuration, as the angular velocity indicating the shake is sampled, and the angular velocity tolerance range changes based on a sampling result, prior to the filming, even in the event that a hand shake tendency changes with every filming, at the time the moving image is displayed, only the frames with no shake are accurately selected in accordance with each shake tendency.

In the filming device, it is acceptable to have a configuration in which: in addition to the shake amount detection unit having an X axis angular velocity detector which detects an X axis angular velocity of an X axis direction in an orthogonal coordinate system, and a Y axis angular velocity detector which detects a Y axis angular velocity of a Y axis direction, the angular velocity sampling unit samples and transmits the X axis angular velocity and the Y axis angular velocity; the range change unit specifies an X axis angular velocity component range and a Y axis angular velocity component range of which the sampled X axis angular velocity and Y axis angular velocity both lie in the angular velocity tolerance range; and the frame selection and transmission unit selects and sequentially transmits only the frames imported by the filming unit in which the X axis angular velocity and Y axis angular velocity lie respectively in the X axis angular velocity component range and the Y axis angular velocity component range.

In the filming device, it is acceptable to have a configuration in which the frame selection and transmission unit, in a case in which all of the sampled X axis angular velocities and Y axis angular velocities are approximately zero, sequentially transmits all of the frames imported by the filming unit.

According to the configuration, in the case in which all of the sampled X axis angular velocities and Y axis angular velocities are approximately zero, all of the filmed frames are transmitted. Consequently, in the event that the filming device is fixed by, for example, a tripod or the like, so that there is little likelihood of shake occurring in the frame, a frame selection process is abbreviated, and a simplification and an efficiency of the process is achieved.

In the filming device, it is acceptable to have a configuration in which, in the event that not all of the sampled X axis angular velocities and Y axis angular velocities lie within the angular velocity tolerance range, the range change unit, in addition to changing the angular velocity tolerance range corresponding to the X axis angular velocity in accordance with an average value of the sampled X axis angular velocities, changes the angular velocity tolerance range corresponding to the Y axis angular velocity in accordance with an average value of the sampled Y axis angular velocities.

In the filming device, it is acceptable to have a configuration in which, in the event that not all of the sampled X axis angular velocities and Y axis angular velocities lie within an angular velocity tolerance range changed by the angular velocity tolerance range change unit, the frame selection and transmission unit selects and sequentially transmits only the frames having whichever of the X axis angular velocity or the Y axis angular velocity, of the sampled X axis angular velocities and Y axis angular velocities, with more points of which a value is zero lies in the angular velocity tolerance range.

According to the configurations, as the angular velocity tolerance range is changed in accordance with a sampling result of the X axis angular velocity and the Y axis angular velocity, it is possible to appropriately change the angular velocity tolerance range in accordance with the shake tendency.

In the filming device, it is acceptable to have a configuration in which, the shake amount detection unit includes: a Z axis angular velocity detector which detects a Z axis angular velocity of a Z axis direction in the orthogonal coordinate system, wherein the range change unit specifies the X axis angular velocity component range, the Y axis angular velocity component range and a Z axis angular velocity component range, of which the sampled X axis angular velocity, Y axis angular velocity and Z axis angular velocity all lie in the angular velocity tolerance range, and wherein the frame selection and transmission unit selects and sequentially transmits only the frames imported by the filming unit in which the X axis angular velocity, Y axis angular velocity and Z axis angular velocity lie respectively in the X axis angular velocity component range, the Y axis angular velocity component range and the Z axis angular velocity component range.

According to the configuration, as each of the X axis angular velocity, the Y axis angular velocity and the Z axis angular velocity are detected, it is possible to more accurately detect shake occurring in the frame.

In the filming device, it is acceptable to have a configuration in which the device includes a history storage unit which stores information on the sampled angular velocity as a history.

According to the configuration, as the information on the sampled angular velocity is stored, at the time of the next sampling, by referring to the history, it is possible to increase the accuracy of a shake tendency determination.

Also, in order to achieve the heretofore described object, a moving image display device is provided, including: a display unit which sequentially displays a plurality of frames to display a moving image; a shake amount detection unit which detects a shake amount of each of a plurality of frames configuring the moving image; a frame position calculation unit which calculates a frame position of each frame based on the shake amount; a reference frame position determination unit which determines a reference frame position to be a reference of a display subject frame; and a frame selection and transmission unit which selects frames positioned within a prescribed range centered on the reference frame position, and sequentially transmits them to the display unit.

In the moving image display device, it is acceptable to have a configuration in which the device includes: a tolerance range setting unit which, based on a shake tolerance range tolerated as a frame used in a moving image display, sets an angular velocity tolerance range corresponding to the relevant shake tolerance range as the prescribed range, wherein the shake amount detection unit detects the angular velocity indicating the shake amount for every frame, and the frame selection and transmission unit selects and sequentially transmits frames of which the angular velocity is within the angular velocity tolerance range.

According to the configuration, as the frames with no shake are selected simply by comparing the angular velocity of the frame and the angular velocity tolerance range, it is possible to quickly and easily display the moving image with only the frames with no shake.

In order to achieve the heretofore described object, the invention provides a shake correction method, including: in addition to detecting a shake amount of each of a plurality of frames configuring a moving image, and calculating a frame position of each frame based on the shake amount; determining a reference frame position to be a reference of a display subject frame, and selecting and sequentially transmitting frames positioned within a prescribed range centered on the reference frame position.

In the correction method, it is acceptable to have a configuration in which the method includes: in addition to detecting an angular velocity indicating the shake amount for every frame; based on a shake tolerance range tolerated as a frame used in a moving image display, setting an angular velocity tolerance range corresponding to the relevant shake tolerance range as the prescribed range; and selecting and sequentially transmitting frames of which the angular velocity is within the angular velocity tolerance range.

In order to achieve the heretofore described object, the invention provides a computer readable recording medium in which a shake correction program is recorded for causing a computer to function as: shake amount detection means which detects a shake amount of each of a plurality of frames configuring a moving image; frame position calculation means which calculates a frame position of each frame based on the shake amount; reference frame position determination means which determines a reference frame position to be a reference of a display subject frame; and frame selection and transmission means which selects and sequentially transmits frames positioned within a prescribed range centered on the reference frame position.

In the recording medium, it is acceptable to have a configuration in which the correction program, in addition to causing the computer to function as tolerance range setting means which, based on, a shake tolerance range tolerated as a frame used in a moving image display, sets an angular velocity tolerance range corresponding to the relevant shake tolerance range as the prescribed range, causes it to function in such a way that the shake amount detection means detects an angular velocity indicating the shake amount for every frame, and the frame selection and transmission means selects and sequentially transmits frames of which the angular velocity is within the angular velocity tolerance range.

BRIEF DESCRIPTION OF THE DRAWINGS

FIG. 12 shows a correlation relationship between a shake tendency and a frame selection algorithm.

DETAILED DESCRIPTION

Hereafter, a description will be given of an embodiment of the invention with reference to the drawings.

First Embodiment

Figure 1:
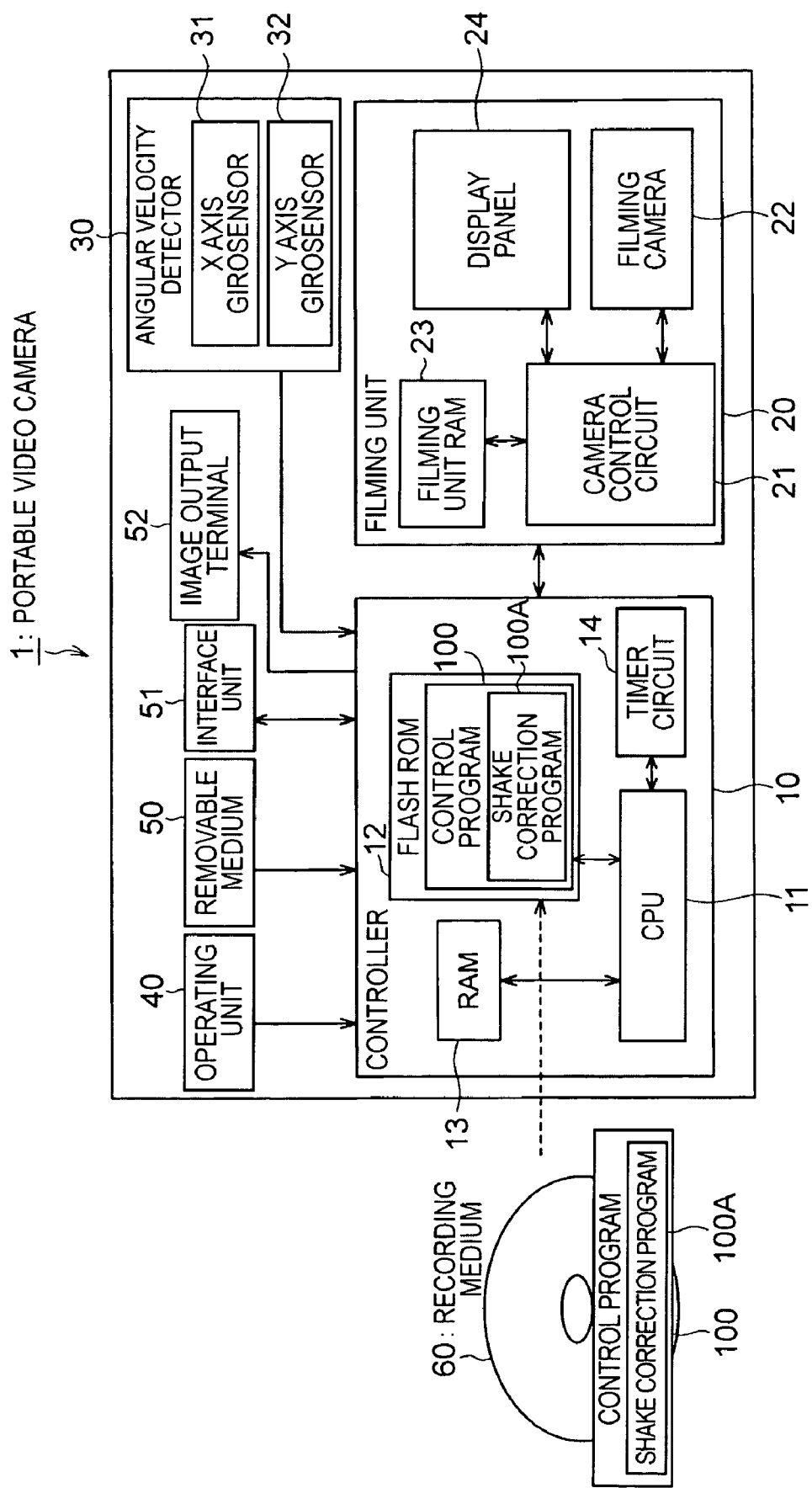
FIG. 1 is a block diagram of a portable digital video camera of a first embodiment of the invention.

FIG. 1 is a block diagram showing a configuration of a portable digital video camera (hereafter called a "portable video camera") 1 according to the embodiment. As shown in FIG. 1, the portable video camera 1 includes a controller 10, a filming unit 20, an angular velocity detector (a shake detector) 30, an operating unit 40, a removable medium 50, an interface unit 51 and an image output terminal 52.

The controller 10, controls each portion of the portable video camera 1 and includes a CPU 11 which executes various programs, a rewritable flash ROM (hereafter called simply an "ROM") 12 which stores a control program 100, executed by the CPU 11, and various data, a RAM 13 which temporarily stores a calculation result of the CPU 11 and various data, and a timer circuit 14 which counts time.

A shake correction program 100A is included in the control program 100 stored in the ROM 12. The controller 10 executes the shake correction program 100A at a time of a moving images reproduction display to realize a moving image reproduction display with no shake.

Since it is possible to record the control program 100 on a computer readable recording medium 60, such as, for example, a CD-ROM, a DVD-ROM or a floppy (registered trade name) disc, and distribute it, the portable video camera 1 is configured so as to be able to read the recording medium 60 and update the control program 100. It is also possible to configure the control program 100 of the portable video camera 1 by connecting a personal computer and the portable video camera 1 with a cable or the like to enable communication, and transmit the control program 100 of the recording medium 60 read by the personal computer to the portable video camera 1.

The filming unit 20, filming a moving image, includes a camera control circuit 21, a filming camera 22, a filming unit RAM 23 and a display panel 24.

The camera control circuit 21, under control of the controller 10, controls each portion of the filming unit 20.

The filming camera 22 sequentially transmits data of a filmed frame (hereafter called simply a "frame") to the camera control circuit 21 at a prescribed sampling rate. The filming camera 22 is configured to include an image sensor which includes photoelectric conversion elements such as CCD's or CMOS's disposed in a matrix form or a honeycomb form, an optical lens system which has a plurality of optical lenses, a lens drive device for driving the optical lens system and realizing a zoom focus, a diaphragming and the like, an A/D converter circuit which converts an image of an analog signal acquired by the image sensor into a digital signal and transmits image data, and the like.

The filming unit RAM 23 functions as a buffer which temporarily stores the frame.

The display panel 24 displays various information concerning a filmed moving image, a setting screen and the like. The display panel 24 is configured to include a flat display panel-such as, for example, a liquid crystal display panel or an organic EL panel.

The removable medium 50, storing moving image data when filming, that is, a filmed frame collection, is, for example, a video tape, a recordable optical disc or a removable disc.

With the configuration described heretofore, the frame transmitted from the filming camera 22, after undergoing a prescribed image process in the camera control circuit 21, is temporarily stored in the filming unit RAM 23, and sequentially stored as the moving image data in the removable medium 50 via the controller 10.

The frame stored in the filming unit RAM 23 is used in a live view display (a real time display) when filming, while the moving image data stored in the removable medium 50 is used when reproducing the filmed moving image after filming.

Figure 2:
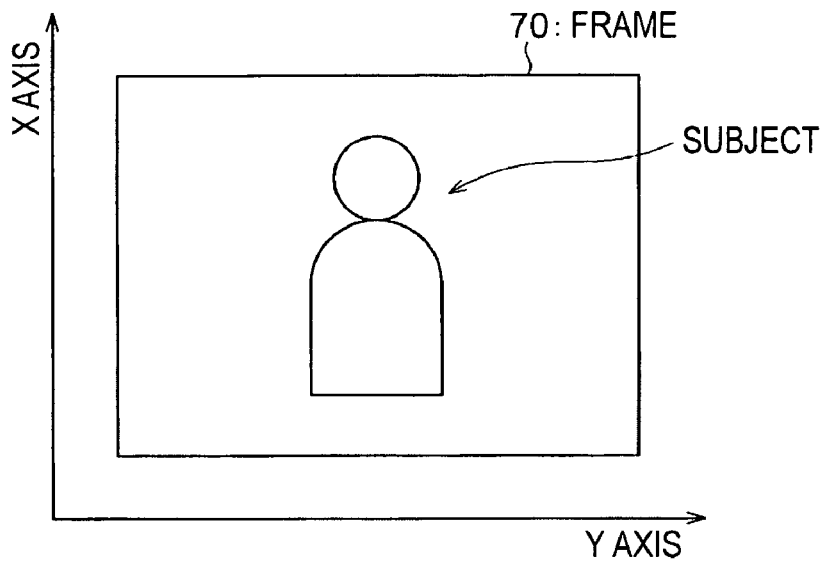
FIG. 2 illustrates a relationship between a frame and a shake axis.

The angular velocity detector 30 detects an amount of hand shake. Specifically, the angular velocity detector 30, as shown in FIG. 2, is designed to individually detect an angular velocity of each of a lateral direction (hereafter defined as a Y axis) movement and a height direction (hereafter defined as an X axis) movement of a frame 70. The angular velocity detector has, as shown in the previously described FIG. 1, two gyrosensors 31 and 32, an X axis gyrosensor 31 and a Y axis gyrosensor 32, and each gyrosensor 31 and 32 transmits an angular velocity detection signal of a voltage value corresponding to the angular velocity to the controller 10.

The controller 10, synchronizing with a sampling period of the frame 70, receives the angular velocity detection signal from each of the gyrosensors 31 and 32, calculates the hand shake amount for each of the X axis and Y axis, and correlates it to the frame, or appends it to the frame and stores it in the removable medium 50.

To give a simple description of the calculation of the hand shake amount, the controller 10 calculates the angular velocity (rad/second) based on the angular velocity detection signal, integrates the angular velocity (rad/second) in a frame sampling interval (second), and calculates a movement angle amount $\theta$ (rad).

Then, the controller 10, based on the movement angle amount $\theta$ (rad), calculates the hand shake amount as a number of pixels (dots).

Figure 3:
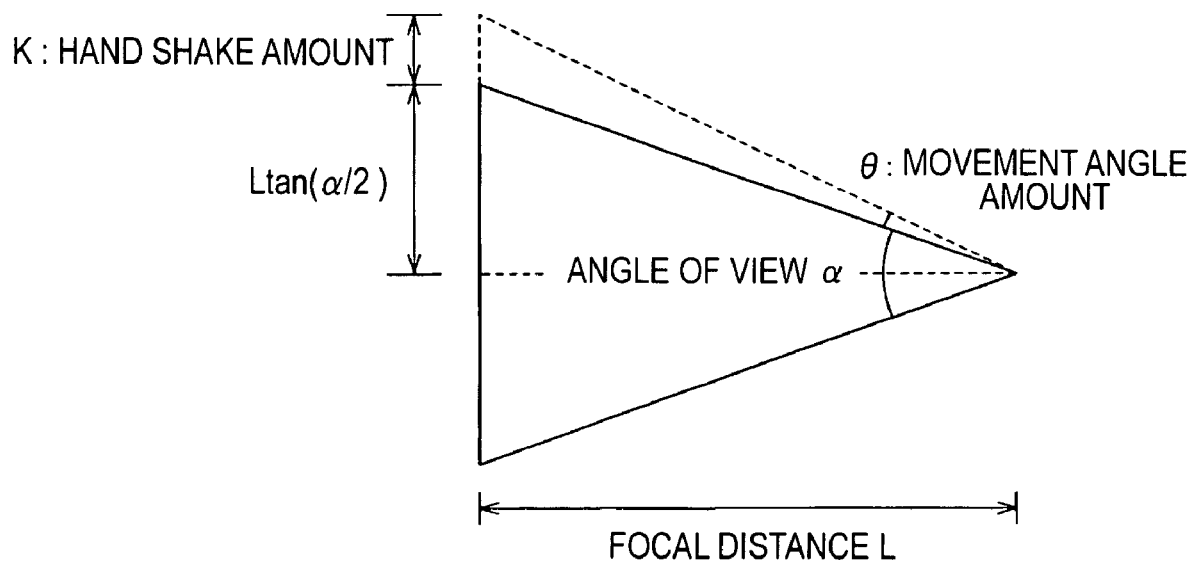
FIG. 3 illustrates a calculation of a hand shake amount.

That is, as shown in FIG. 3, with a focal distance of L and an angle of view of $\alpha$, in the event that a relationship angle of view $\alpha$>the movement angle amount $\theta$ is established, a relational expression of a hand shake amount $K$ (dots)=the movement angle amount $\theta$×a correction coefficient $r$     (equation 1)

is established between the hand shake amount K (dots) and the movement angle amount $\theta$, where the correction coefficient r=the focal distance L×(1+$\tan^2(\alpha/2)$), and the angle of view a is a value determined by the focal distance L and a size of the image sensor (number of pixels). The controller 10, based on the equation (1), calculates the hand shake amount for the X axis and the Y axis for each frame.

As the voltage value of the angular velocity detection signal transmitted when the angular velocity (rad/second) is zero differs because of an individual difference between the gyrosensors 31 and 32, after a power source of a main body of the portable video camera 1 is turned on, the controller 10, before starting the filming, samples the angular velocity detection signal of each gyrosensor 31 and 32, and sets an average value as a zero point voltage value. To be more specific regarding the setting, the controller 10, as well as detecting a plurality of the zero point voltage values, first acquires the average value of the zero point voltage values.

Next, in the event that a percentage of the zero point voltage values of which a difference with the average value is equal to or less than a prescribed value is equal to or higher than a certain percentage (for example, 99%), the average value is set as an actual zero point voltage value. As a result, the zero point voltage value when the main body is in a motionless condition is set.

The operating unit 40, having a plurality of operating elements operated by a user, has, for example, a power source button and operating keys for inputting various instructions such as a filming start/finish.

The interface unit 51 is an interface for connecting the portable video camera 1 with the personal computer with a cable or the like to enable communication. When transmitting the moving image data stored in the removable medium 50 to the personal computer, the moving image data is transmitted to the personal computer via the interface 51.

The image output terminal 52 is a terminal which transmits an image signal of the moving image to an external display device such as a television or a projector. In addition to the components described heretofore, the portable video camera 1 includes an audio circuit for receiving, recording and reproducing a sound signal, a sound output terminal for transmitting the sound signal to an external speaker, an external amplifier and the like.

Figure 4:
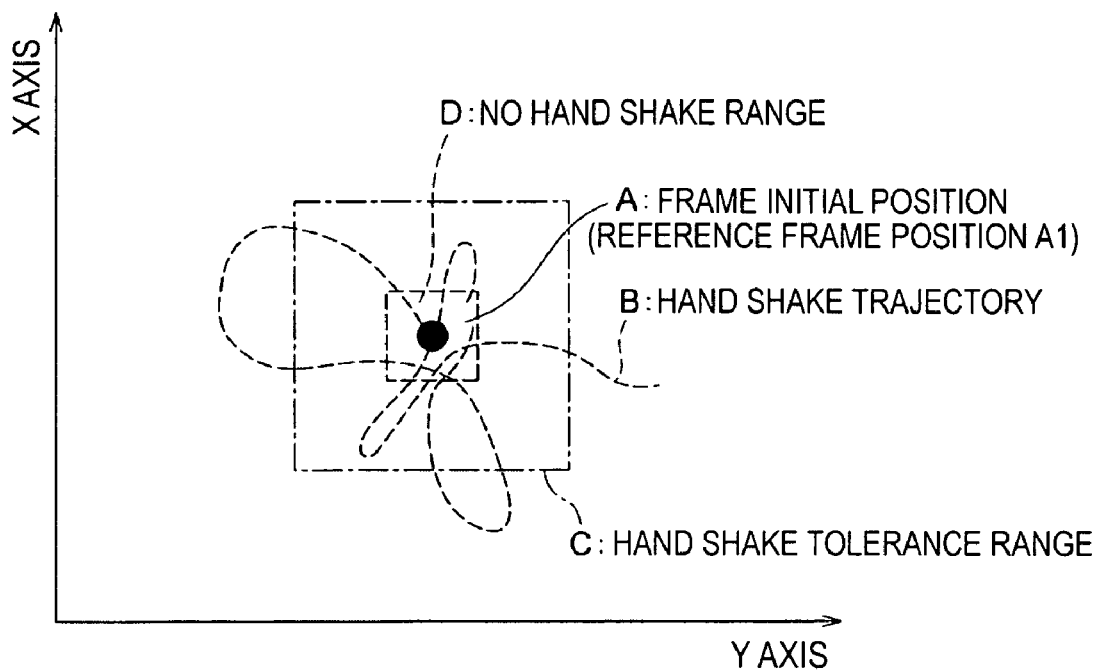
FIG. 4 illustrates a hand shake tolerance range.

Herein, generally, in the event that hand shake occurs when the user is filming, a hand shake trajectory B that is a trajectory which frequently passes through a vicinity of a frame initial position A when the user has started filming, as shown in FIG. 4, it can be considered that a subject the user is attempting to film is positioned in the vicinity of the frame initial position A. Consequently, even in the event that the portable video camera 1 selects only frames in the vicinity of the frame initial position A and displays them when reproducing the moving image, it does not give the user a strange feeling.

Furthermore, in the event that a plurality of frames differing in a distance between a frame center position (hereafter called a "frame position") is reproduced as a moving image, the smaller the distance between the frame positions, the less noticeable the shake is between the frames.

Consequently, by the portable video camera 1, with the frame initial position A as a center and setting a distance range in which the shake between the frames is not noticeable as a no hand shake range D and, when reproducing the moving image, selecting and sequentially displaying only frames of which the frame position lies in the no hand shake range D, it is possible to reproduce and display a moving image showing the subject without giving a strange feeling, and suppressing the shake.

However, even in the event that the user has deliberately filmed a periphery of the subject, there is a danger that a frame which has filmed the periphery is ignored at the time of the moving image reproduction display.

Figure 5:
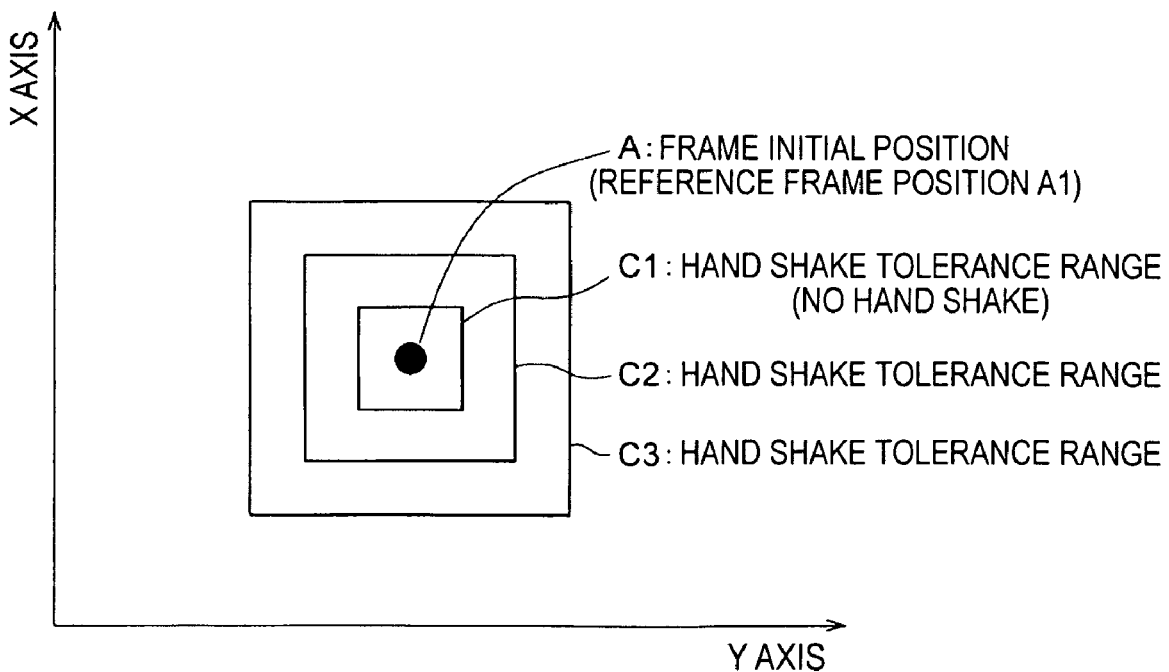
FIG. 5 illustrates a hand shake tolerance range.

As such, in the portable video camera 1, as shown in FIG. 5, three hand shake tolerance ranges C1 to C3 of differing ranges are set in advance, and configured so that the user can select any one of them, and furthermore, are configured so that the range of each hand shake tolerance range C1 to C3 can be set. Therefore, it is possible to customize the hand shake tolerance ranges C in response to the user's preference, habit or the like when filming. The hand shake tolerance range C1 has a smallest amount of tolerance and is set to the same extent of range as the no hand shake range D. Thus, in the event that the hand shake tolerance range C1 is selected, a moving image reproduction display is realized in which the shake is barely noticeable.

Herein, in a case of a configuration in which only frames which lie within the hand shake tolerance ranges C are selected and displayed at the time of the moving image reproduction display, depending on the user's hand shake, there is a risk of a comparatively long time being needed for the frames to return within the range of the hand shake tolerance ranges C. In this case, a display time of a certain frame only becomes extremely long, and the moving image reproduction display appears to have stopped. As such, in the portable video camera 1, the longest time for which one frame is displayed is set in advance as a maximum no-update time Ta. As such, at the time of the moving image reproduction display, in the event that the display time of a certain frame exceeds the maximum no-update time Ta, and regardless of whether or not a current frame position lies within the hand shake tolerance ranges C, the portable video camera 1 displays the current frame. As a result, in the moving image reproduction display, another frame 70 is always displayed within a certain time from a certain frame 70 being displayed. As such, the moving image never appears to have stopped.

Furthermore, in the event that the moving image filming is carried out over a comparatively long time, it is fully predictable that the user will carry out camerawork such as panning. In this case, by fixing a frame position to be a center of the hand shake tolerance ranges C as a frame initial position A, even though the user carries out the camerawork, a frame filmed by the camerawork is ignored at the time of the moving image reproduction display.

As such, in the portable video camera 1, a frame position update time Tb, which shows a time interval at which the frame position to be the center of the hand shake tolerance ranges C (hereafter called a "frame reference position") is changed, is set in advance. Thus, the portable video camera 1, after starting the moving image reproduction display, updates the reference frame position every time the frame position update time Tb elapses. This enables a moving image reproduction display which reflects the user's camerawork when filming. In the same way as the maximum no-update time Ta, the frame position update time Tb is also configured so that a plurality of values may be set in advance and the user can select any one of them. Also, the maximum no-update time Ta and the frame position update time Tb are stored in advance in the ROM 12. As such, an initial setting value or a value selected by the user is stored in the ROM 12.

Next, a description of an operation of the portable video camera 1 will be given. In fact, a description will be given first of a live view moving image display process in the case of the live view display of the moving image on the display panel 24 when filming, and second of a recorded moving image display process in the case of displaying the moving image after filming based on the moving image data stored in the removable medium 50.

Figure 6:
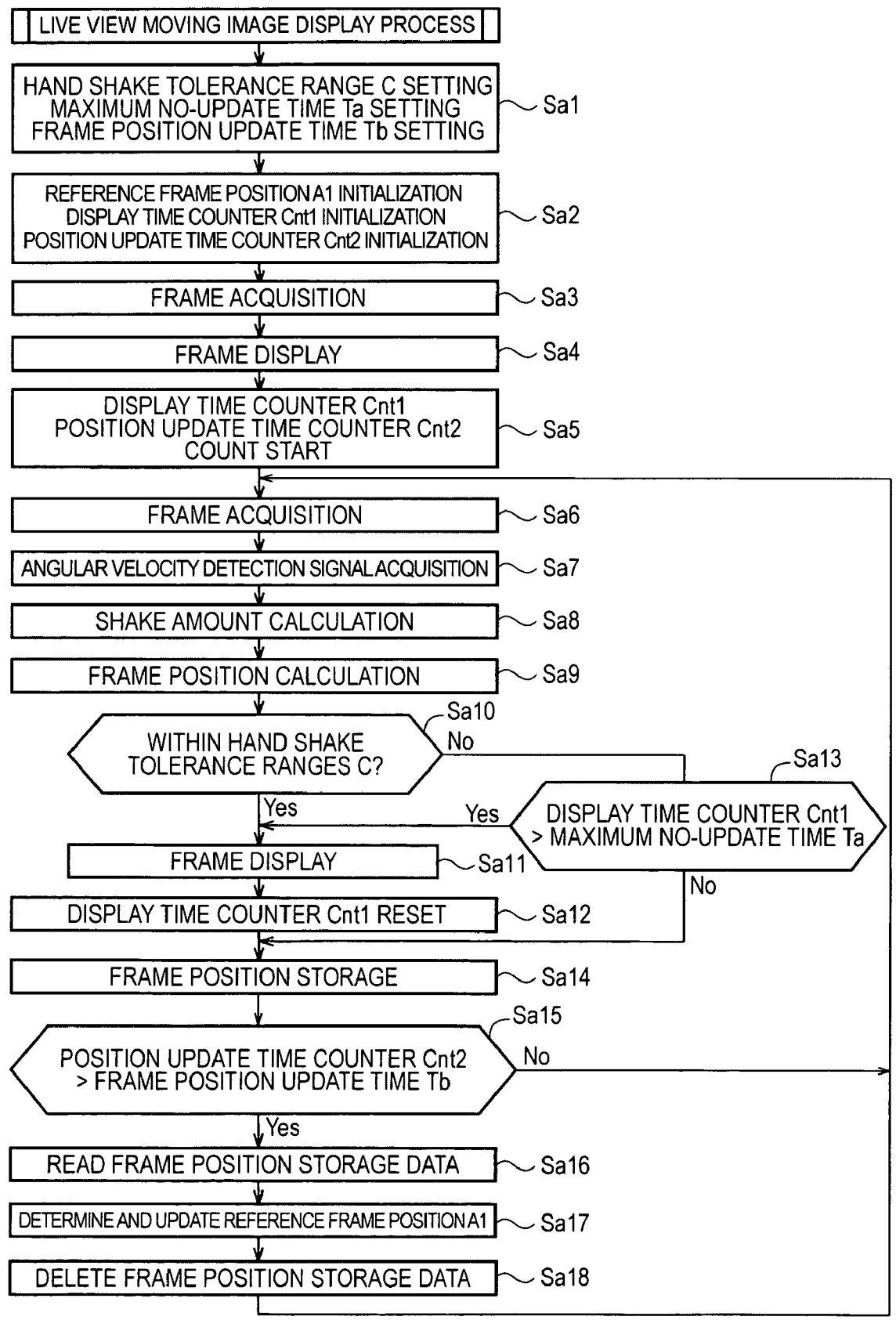
FIG. 6 is a flowchart of a live view moving image display process.

FIG. 6 is a flowchart of the live view moving image display process. The live view moving image display process is executed when a filming start instruction is input by the user and is executed continuously until a filming finish instruction is input.

As shown in FIG. 6, in the event that the filming start instruction is carried out, the controller 10 reads the hand shake tolerance range C selected by the user, the maximum no-update time Ta and the frame position update time Tb from the ROM 12 and sets them (step Sa1) and, in addition to initializing a reference frame position A1 to coordinates (0, 0), initializes a counter value of a display time counter Cnt1 and a position update time counter Cnt2 of the timer circuit 14 to "0" (step Sa2). The display time counter Cnt1 counts a display time of the frames 70, while the position update time counter Cnt2 counts an update timing of the reference frame position A1.

Next, the controller 10 controls the filming unit 20 to start importing the frames 70 at the prescribed sampling rate and, in addition to acquiring a first frame of the frames 70 (step Sa3), displays the frame 70 on the display panel 24 (step Sa4).

Next, the controller 10, after controlling the timer circuit 14 to start a count of the display time counter Cnt1 and the position update time counter Cnt2 (step Sa5), acquires a next frame 70 from the filming unit 20 in synchronization with a sampling timing of the frame 70 (step Sa6), and acquires the angular velocity detection signal from the angular velocity detector 30 in synchronization with an acquisition timing of the frame 70 (step Sa7). Then, the controller 10 calculates the shake amount of the frame 70 acquired on this occasion based on the angular velocity detection signal (step Sa8), and calculates the frame position based on the shake amount (step Sa9).

Next, the controller 10 determines whether or not the frame position on this occasion is within the hand shake tolerance ranges C (step Sa10) and, if it is within the hand shake tolerance ranges C (step Sa10: Yes), displays the frame 70 on the display panel 24 (step Sa11), and also resets the display time counter Cnt1 and causes it to start the count from "0" (step Sa12). In contrast, if the result of the determination of step Sa10 is that the frame position on this occasion is outside the hand shake tolerance ranges C (step Sa10: No), the controller 10 determines whether or not the counter value of the display time counter Cnt1 has exceeded the maximum no-update time Ta (step Sa13) and, if it has exceeded the maximum no-update time Ta (step Sa13: Yes), returns the process to the previously described step Sa11 in order to display the frame 70 on this occasion. However, if it has not exceeded the maximum no-update time Ta (step Sa13: No), the process advances to step Sa14 without displaying the frame 70 on this occasion.

Figure 7:
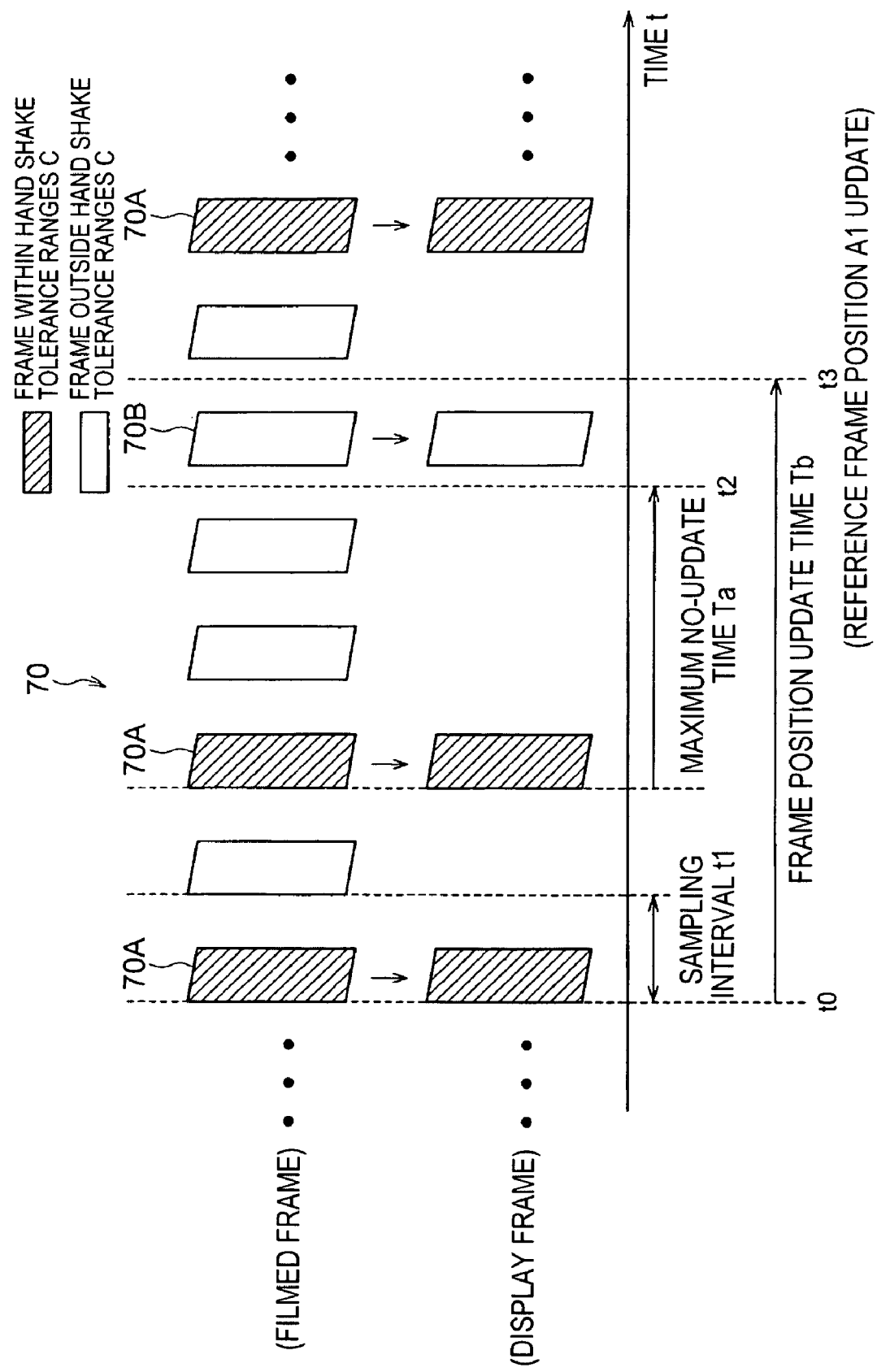
FIG. 7 schematically shows a configuration of a frame to be a subject of a moving image display.

By the process heretofore described, as a result of the live view moving image display process, as shown in FIG. 7, only frames 70A, of the sequentially acquired frames 70, positioned within the hand shake tolerance ranges C are displayed, and a moving image display having suppressed shake is carried out. Furthermore, in the event that a next frame 70A is not displayed before the maximum no-update time Ta elapses from a display time t1 of a previous frame 70A, a first frame 70B is displayed from a timing t2 at which the maximum no-update time Ta elapses, regardless of the hand shake tolerance ranges C. This prevents the moving image display from appearing that is has stopped.

Returning to the previously described FIG. 6, in step Sa14, the controller 10 stores the frame position-calculated in step Sa9 in the RAM 13, and then determines whether or not the counter value of the position update time counter Cnt2 has exceeded the frame position update time Tb (step Sa15). Then, if the counter value of the position update time counter Cnt2 has not exceeded the frame position update time Tb (step Sa15: No), and therefore since there is no need to update the reference frame position A1, the controller 10 returns the process to step Sa6 in order to display the next frame 70.

If the counter value of the position update time counter Cnt2 has exceeded the frame position update time Tb (step Sa15: Yes), the controller 10 executes a next process in order to update the reference frame position A1. That is, in order to update the reference frame position A1 to an optimum frame position, the controller 10 firstly reads position information of each frame 70 accumulated by the previously described process of step Sa14 from the RAM 13 (step Sa16), secondly calculates, based on the position information, a point at which the frame positions are concentrated (that is, a position which the user is attempting to film), and thirdly determines the position as the reference frame position A1 (step Sa17). Then, the controller 10, after deleting the position information of the frames 70 accumulated in the RAM 13 (step Sa18), returns the process to step Sa6 in order to display the next frame 70.

By the process shown in FIG. 7, since the reference frame position A1 is changed every time the frame position update time Tb elapses, a moving image which tracks the user's camerawork is enabled. Apart from the configuration in which the reference frame position A1 is only changed when the frame position update time Tb elapses, it is also acceptable to have a configuration in which, for example, in the event that the frame 70 is displayed based on the elapsing of the maximum no-update time Ta, the position of the frame 70 is set as the reference frame position A1.

In the live moving image display process described heretofore, the filmed frames 70 are sequentially recorded, and correlated to the frame positions, as the moving image data in the removable medium 50. Then, after the filming, the reproduction display of the recorded moving image is carried out based on the moving image data. Hereafter, a description will be given of the recorded moving image display process.

Figure 8:
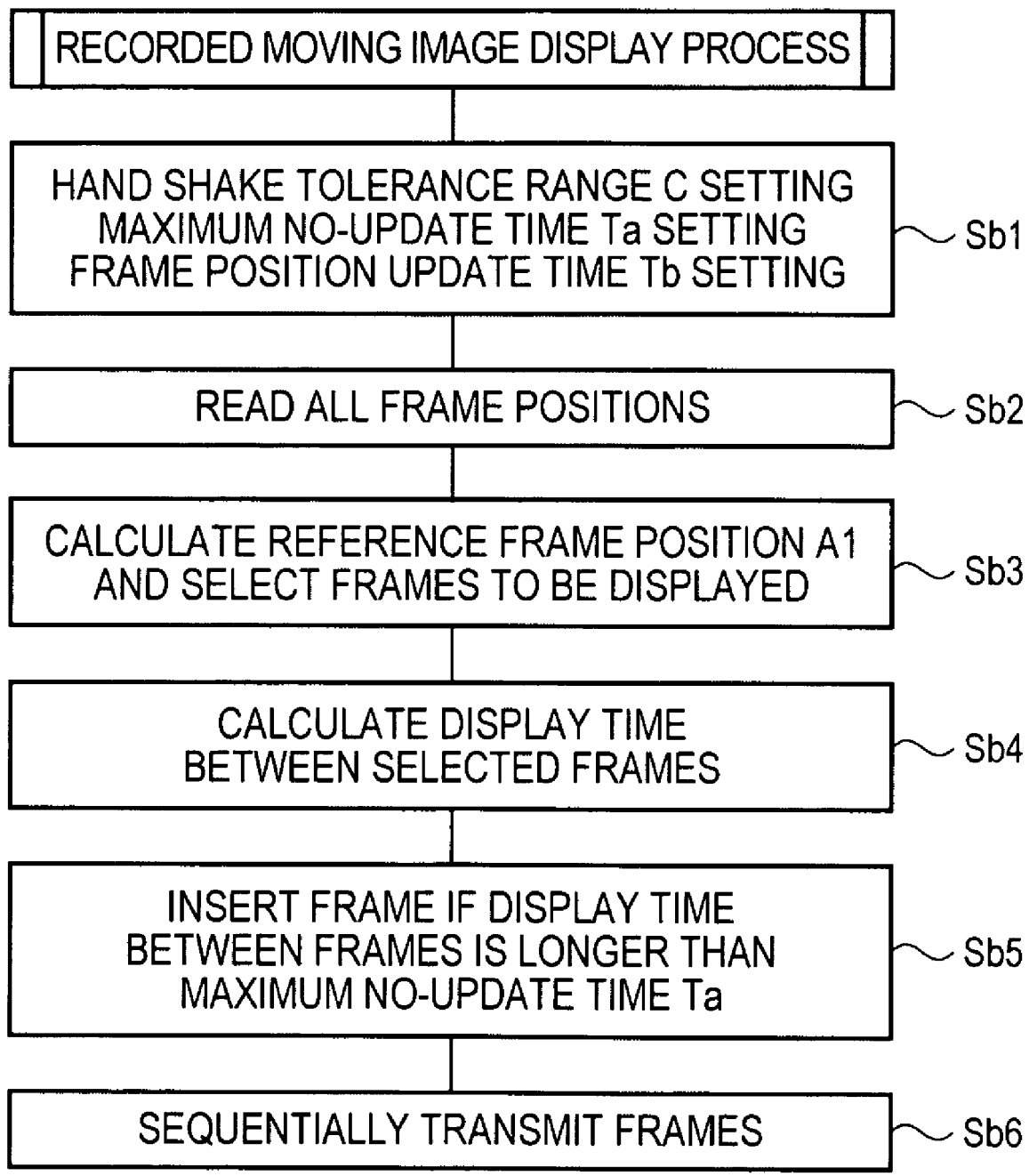
FIG. 8 is a flowchart of a recorded moving image display process.

FIG. 8 is a flowchart of the recorded moving image display process. The recorded moving image display process is started in the event that a recorded moving image reproduction instruction is input by the user.

As shown in FIG. 8, in the event that the recorded moving image reproduction instruction is input, the controller 10 reads the hand shake tolerance range C selected by the user, the maximum no-update time Ta and the frame position update time Tb from the ROM 12 and sets them (step Sb1), then reads the frame position of all of the frames 70 configuring the moving, image data from the removable medium 50 (step Sb2), and executes a process which, based on the frame positions, selects the frames 70 to be displayed and transmits them.

That is, based on the frame position of each frame 70 and the frame position update time Tb, the controller 10 sequentially determines one or a plurality of reference frame positions A1 and, based on the reference frame position A1 and the hand shake tolerance range C, selects the frames 70A to be displayed (step Sb3). Next, the controller 10 calculates a display time between each selected frame 70A (step Sb4) and, in the event that the display time between the frames 70A is longer than the maximum no-update time Ta, inserts a frame 70B which lies between the relevant frames 70A (step Sb5), then sequentially transmits the frames thus generated to the display panel 24 or the image output terminal 52 (step Sb6). By this, when reproducing the recorded moving image, only the frames 70A lying within the hand shake tolerance range C centered on the reference frame position A1 are displayed, and also, in the event that the next frame 70A is not displayed even though the maximum no-update time Ta has elapsed, a next frame 70B is displayed regardless of the hand shake tolerance range C, thereby enabling the suppression of shake and a smooth moving image reproduction.

As heretofore described, according to the portable video camera 1 according to the embodiment, since the configuration is so as to select the frames 70 positioned within the hand shake tolerance range C centered on the reference frame position A1, sequentially transmit them to the display panel 24 or the image output terminal 52, and display the moving image, only the frames 70 positioned within the hand shake tolerance range C centered on the reference frame position A1 are displayed at the time of the moving image reproduction display, on account of which a moving image display with suppressed shake is possible.

Furthermore, since a process such as a determination of a display subject area or an extraction of the display subject area for each frame 70 as in heretofore known kinds of hand shake correction are unnecessary, even in the event that the sampling rate of the frame 70 is high, it is possible to sufficiently correct the shake.

Also, since there is no need to extract the display subject area from the frame 70, and all areas of the frame 70 are used for the moving image display, it is possible to achieve a downsizing of the image sensor (filming device) and a reduction in capacity of the RAM 13, the filming unit RAM 23, the removable medium 50 and the like, and it is also possible to easily realize a reproduction display of a high resolution moving image.

Furthermore, according to the portable video camera 1 according to the embodiment, since the configuration ahs the frame position of the first frame 70 when starting the filming (that is, a leading frame of the frames 70 configuring the moving image), as the reference frame position A1, the frame position in which the user first filmed the subject is made the reference frame position A1, and it is possible to display only the frames 70 filmed centered on the subject as the moving image.

Furthermore, according to the portable video camera 1 according to the embodiment, since the configuration updates the reference frame position A1 every time the frame position update time Tb, contrived to be appropriately selectable and settable by the user, elapses, even in the event that the filming is carried out over a comparatively long time, and the user carries out the camerawork such as panning during the filming, it is possible to track the camerawork and change the reference frame position A1, thereby enabling the moving image reproduction display which reflects the user's camerawork when filming.

Although the portable video camera 1 in the embodiment updates the reference frame position A1 every time the frame position update time Tb elapses at the time of the live view moving image display and, at the time of the recorded moving image display, at the timing at which the frame position update time Tb elapses on a display time axis after determining the reference frame position A1, the invention is not limited to this. For example, it is also acceptable to update the reference frame position A1 every number of frames corresponding to the frame position update time Tb.

Also, according to the portable video camera 1 according to the embodiment, when updating the reference frame position A1, the position in which the frame positions of each frame 70 lying within the frame position update time Tb are concentrated as the reference frame position A1, it is possible to have the position in which the frame positions are concentrated, that is, a place which the user is attempting to film, as the reference frame position A1. By this, since only the frames 70 centered on the reference frame position A1 are displayed as the moving image, a moving image reproduction display centered on a place which the user desires is possible.

Also, according to the portable video camera 1 according to the embodiment, in the event that the display time from the display of the previous frame 70 to the display of the next frame 70 (that is, the display time between the frames) exceeds the maximum no-update time Ta, the next frame 70 is inserted between the frames regardless of the frame position, the next frame 70 is always displayed within a certain time from the previous frame 70 being displayed. By this, the display time of one frame 70 is prevented from becoming abnormally long, and it is possible to show the moving image smoothly.

Although the portable video camera 1 in the embodiment inserts the frame 70 every time the maximum no-update, time Ta elapses at the time of the live view moving image display and, at the time of the recorded moving image display, in the event that the time interval on the display time axis between the frames displayed exceeds the maximum no-update time Ta, the invention is not being limited to this. For example, it is also acceptable to insert the frame 70 every number of frames corresponding to the maximum no-update time Ta.

Second Embodiment

In the first embodiment, the frame selected at the time of the moving image reproduction display was determined based on the reference frame position A1 and the hand shake tolerance range C. In contrast, in a second embodiment, a description will be given of a portable video camera 1A which determines the hand shake tolerance ranges C in accordance with a tendency of the user's hand shake.

Figure 9:
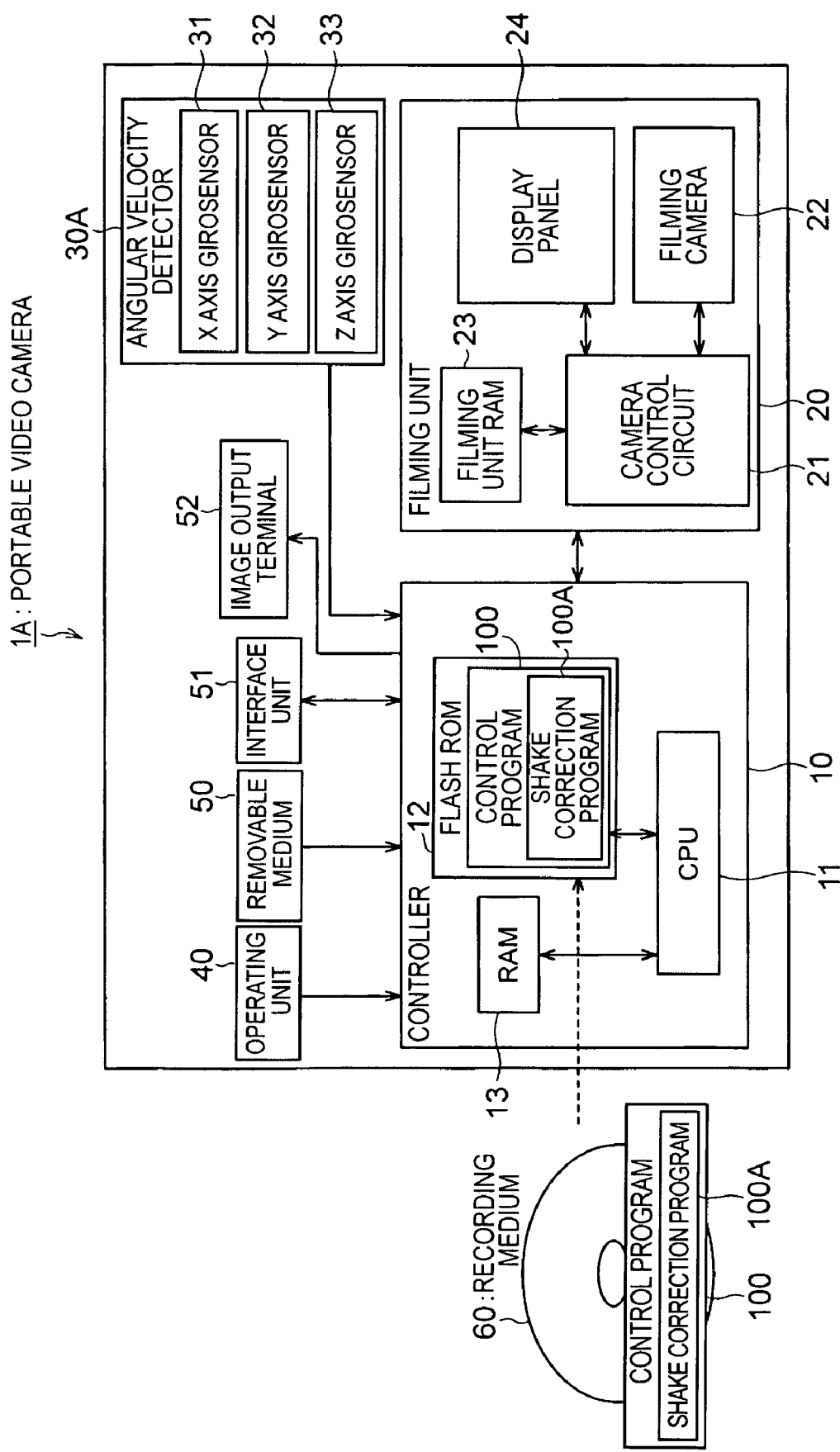
FIG. 9 is a block diagram of a portable digital video camera of a second embodiment of the invention.

FIG. 9 is a block diagram showing a configuration of the portable video camera 1A according to the embodiment. As, shown in the figure, the portable video camera 1A includes an angular velocity detector 30A which has, in addition to the X axis gyrosensor 31 and the Y axis gyrosensor 32, a Z axis gyrosensor 33. The Z axis gyrosensor 33 detects an angular velocity $\omega z$ which accompanies a movement in a direction perpendicular to an X-Y axis (hereafter defined as a Z axis) shown in the previously described FIG. 2, and transmits an angular velocity detection signal of a voltage value corresponding to the angular velocity $\omega z$ to the controller 10.

With the heretofore described configuration, in the case of the live view display of the moving image on the display panel 24 during filming, or in the case of transmitting the moving image stored in the removable medium 50 via the image output terminal 52 to the external display etc. and displaying it, by selecting the frames 70 with no shake from among the filmed frames, or with the shake amount within a prescribed tolerance range, and transmitting them, the portable video camera 1A realizes a moving image reproduction display with suppressed shake. Hereafter, a detailed description of the frame selection will be given.

Figure 10:
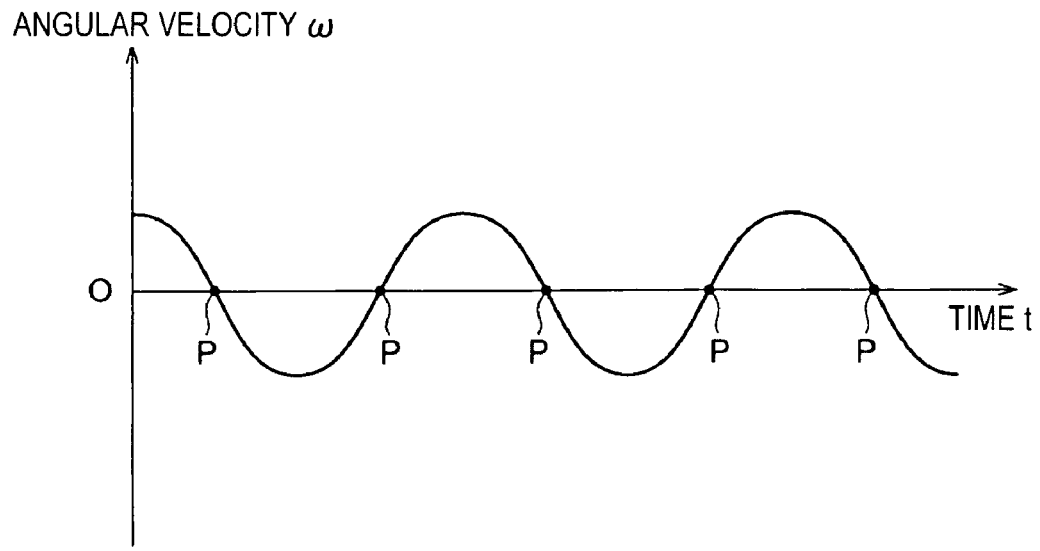
FIG. 10 illustrates a zero cross point.

As shown in FIG. 10, a zero cross point P at which an angular velocity $\omega$ detected by the angular velocity detector 30A becomes "zero", indicates that there is no shake of the portable video camera 1A in the angular velocity $\omega$ direction, That is, it is motionless. Consequently, in the event that the filming is carried out with the portable video camera 1A fixed on a tripod or the like, as there is hardly any occurrence of hand shake, an angular velocity $\omega x$ of the X axis, an angular velocity $\omega y$ of the Y axis, and the angular velocity $\omega z$ of the Z axis are all "approximately zero", and the zero cross points P of the angular velocities $\omega x$, $\omega y$ and $\omega z$ coincide. In this case, as there is no shake in the filmed frames 70 either, the portable video camera 1A selects and displays all of the filmed frames 70 at the time the moving image is displayed.

Also, in the event that the filming is carried out without the portable video camera 1A being fixed, due to an effect of hand shake and the like, the zero cross points P of the angular velocities $\omega x$, $\omega y$ and $\omega z$ hardly ever coincide, in which case the portable video camera 1A selects and displays only the frames 70 of which the shake amount is of an unnoticeable degree at the time of the moving image reproduction display.

To give a detailed description, generally, in a case in which there is a small shake amount inside the frame 70, even in the event that the frame 70 is displayed, it is difficult for a human to perceive the shake.

Therefore, by specifying a range of the angular velocity ω corresponding to a range of the shake amount which is difficult for a human to perceive as an angular velocity tolerance range E, by causing the portable video camera 1 (at the time of the moving image reproduction display), to select and display only the frames 70 of which the angular velocities ωx, ωy and ωz all lie within the angular velocity tolerance range E, a moving image reproduction display with unnoticeable shake is realized.

The relationship of the equation (1) described in the first embodiment existing between the shake amount and the angular velocity ω, according to the equation (1), when a shake amount K is decided, a movement angle amount θ, that is, the angular velocity ω, can be obtained. That is, the angular velocity tolerance range E can be obtained based on a range of the shake amount in which the shake is difficult to perceive.

Figure 11:
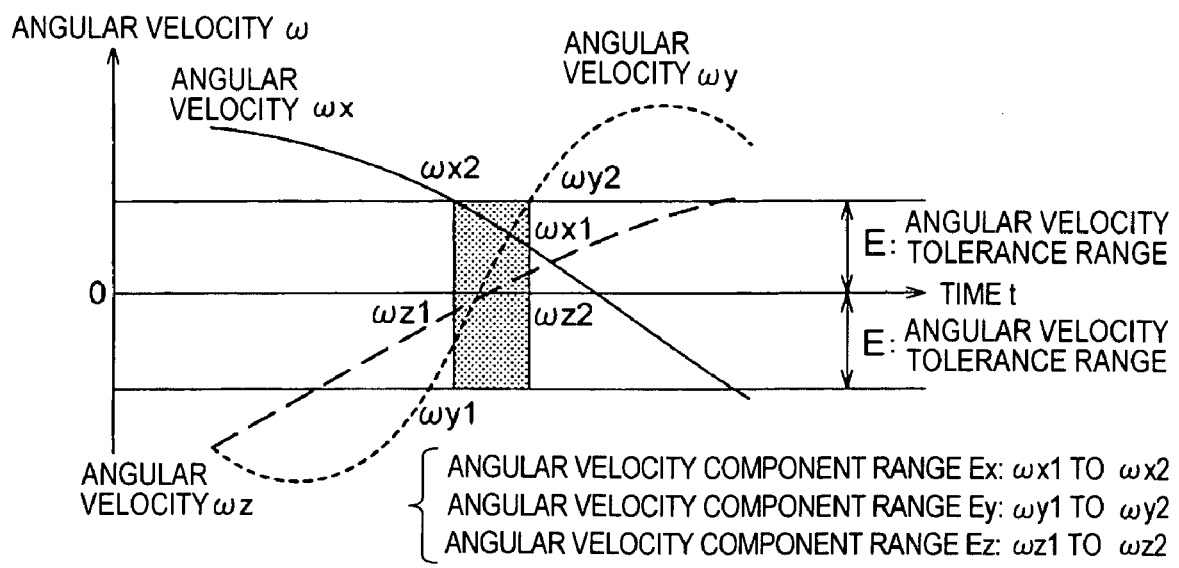
FIG. 11 shows a relationship between a sampling angular velocity and an angular velocity tolerance range.

At this time, as the angular velocity ω has three components, the angular velocities ωx, ωy and ωz, as shown in FIG. 11, angular velocity component ranges Ex, Ey and Ez (Ex: ωx1 to ωx2, Ey: ωy1 to ωy2, Ez: ωz1 to ωz2) lying in the angular velocity tolerance range E are defined for each component respectively.

Since the angular velocity component ranges Ex, Ey, and Ez are set in advance as the angular velocity tolerance range E in the portable video camera 1A, the portable video camera 1A (by selecting and transmitting only frames 70 of which the angular velocities ωx, ωy and ωz lie in the angular velocity component ranges Ex, Ey and Ez at the time of the moving image reproduction display), carries out the moving image reproduction display with unnoticeable shake.

In this way, as the portable video camera 1A carries out a selection of the frames 70 with no shake by determining, for each frame 70 configuring the moving image, whether or not the angular velocity ω lies in the angular velocity tolerance range E, it is possible to easily and quickly perform the required processing.

Although one set of the angular velocity component ranges Ex, Ey and Ez is shown in FIG. 11, in a case in which, for each angular velocity ωx, ωy and ωz, a plurality of points lying in the angular velocity tolerance range E exists along the time axis, the angular velocity component ranges Ex, Ey and Ez are set for each point.

However, depending on the user, there are a variety of hand shake tendencies (the size of the hand shake etc.). Also, even when the user is the same, the hand shake tendency changes depending on a physical condition of the day, the use of a tripod and the like. Consequently, there is a risk that the angular velocities ωx, ωy and ωz do not lie simultaneously in the angular velocity tolerance range E, and there will be no (or extremely few) frames 70 to be selected at the time of the moving image reproduction display.

As such, in order to enable a change of a selection condition of the frame 70 at the time of the moving image reproduction display in response to the hand shake tendency when filming, the portable video camera 1A has a plurality of algorithms as frame selection algorithms at the time the moving image reproduction is displayed, and furthermore, when filming, by sampling the angular velocity co prior to an actual filming, it identifies the shake tendency when filming, and employs a frame selection algorithm appropriate to the shake tendency.

FIG. 12 shows a correlation relationship between the shake tendency and the frame selection algorithm. As shown in the figure, seven algorithms, algorithms 110A to 110G, are prepared in advance in a frame selection algorithm 110.

The algorithm 110A is an algorithm employed in the event that a shake tendency 105A, in which the zero cross points P of each angular velocity ωx, ωy and ωz all coincide, is acquired by the sampling of the angular velocities ωx, ωy and ωz before the filming. In the case of the shake 105A, since hardly any shake occurs in the filmed frames 70, with the algorithm 110A, all the filmed frames 70 are selected and transmitted at the time of the moving image reproduction display.

The algorithm 110B is an algorithm employed in the event that a shake tendency 105B, in which not all of the zero cross points P of the angular velocities ωx, ωy and ωz coincide, but the angular velocities ωx, ωy and ωz all lie in the angular velocity tolerance range E, is acquired by the sampling of the angular velocities ωx, ωy and ωz before the filming. With the algorithm 110B, the angular velocity component ranges Ex, Ey and Ez are determined, based on the angular velocities ωx, ωy and ωz sampled before the filming and the angular velocity tolerance range E and, at the time of the moving image reproduction display, only the frames 70 which have angular velocities ωx, ωy and ωz lying in the angular velocity component ranges Ex, Ey and Ez are selected and transmitted.

The algorithm 110C is an algorithm employed in the event that a shake tendency 105C, in which not all of the angular velocities ωx, ωy and ωz lie in the angular velocity tolerance range E but, with the exception of the angular velocity ωz of the Z axis, in which the shake is unlikely to occur, the other angular velocities ωx and ωy all lie in the angular velocity tolerance range E, is acquired by the sampling of the angular velocities ωx, ωy and ωz before the filming. With the algorithm 110C, the angular velocity component ranges Ex and Ey are obtained for the angular velocities ωx and ωy, excepting the angular velocity ωz, and, at the time of the moving image reproduction display, only the frames 70 which have angular velocities ωx and ωy lying in the angular velocity component ranges Ex and Ey are selected and transmitted.

Furthermore, in the event that a result of the sampling does not fall into any of the hand shake tendencies 105A to 105C, due to a reason such as the hand shake at the time of the sampling before the filming being comparatively large, one of the algorithms 110D to 110F is employed.

The algorithms 110D to 110F are employed in the event that the hand shake tendency is any of the following kinds of tendency.

The angular velocity tolerance range E changed in the following way is used in a determination of hand shake tendencies 105D and 105E. That is, with average angular velocities ωxA, ωyA and ωzA, averaged for each angular velocity ωx, ωy and ωz sampled before the filming, as horizontal axis values of each angular velocity ωx, ωy and ωz (that is, an amplitude value "zero") as shown in FIG. 13, the angular velocity tolerance range E is reset with respect to the horizontal axis, and the angular velocity tolerance range E is essentially changed.

In the event that all of the angular velocities ωx, ωy and ωz sampled before the filming lie in the angular velocity tolerance range E, it becomes the hand shake tendency 105D, and the algorithm 110D is employed. With the algorithm 110D, the angular velocity component ranges Ex, Ey and Ez are determined, based on the angular velocities ωx, ωy and ωz sampled before the filming and the angular velocity tolerance range. E and, at the time of the moving image reproduction display, only the frames 70 which have angular velocities ωx, ωy and ωz lying in the angular velocity component ranges Ex, Ey and Ez are selected and transmitted.

Figure 13:
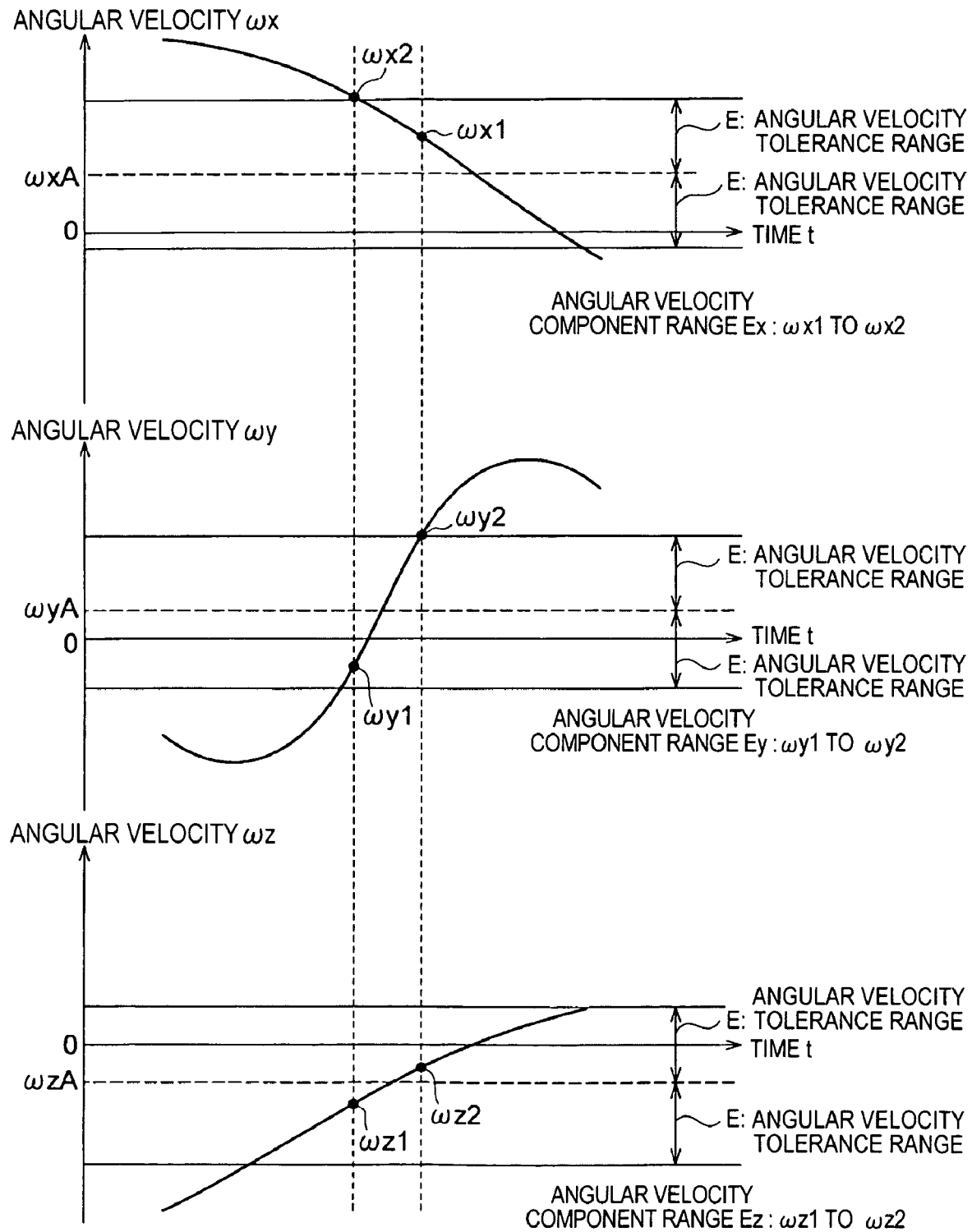
FIG. 13 illustrates the shake tendency based on the sampling angular velocity.
Figure 14:
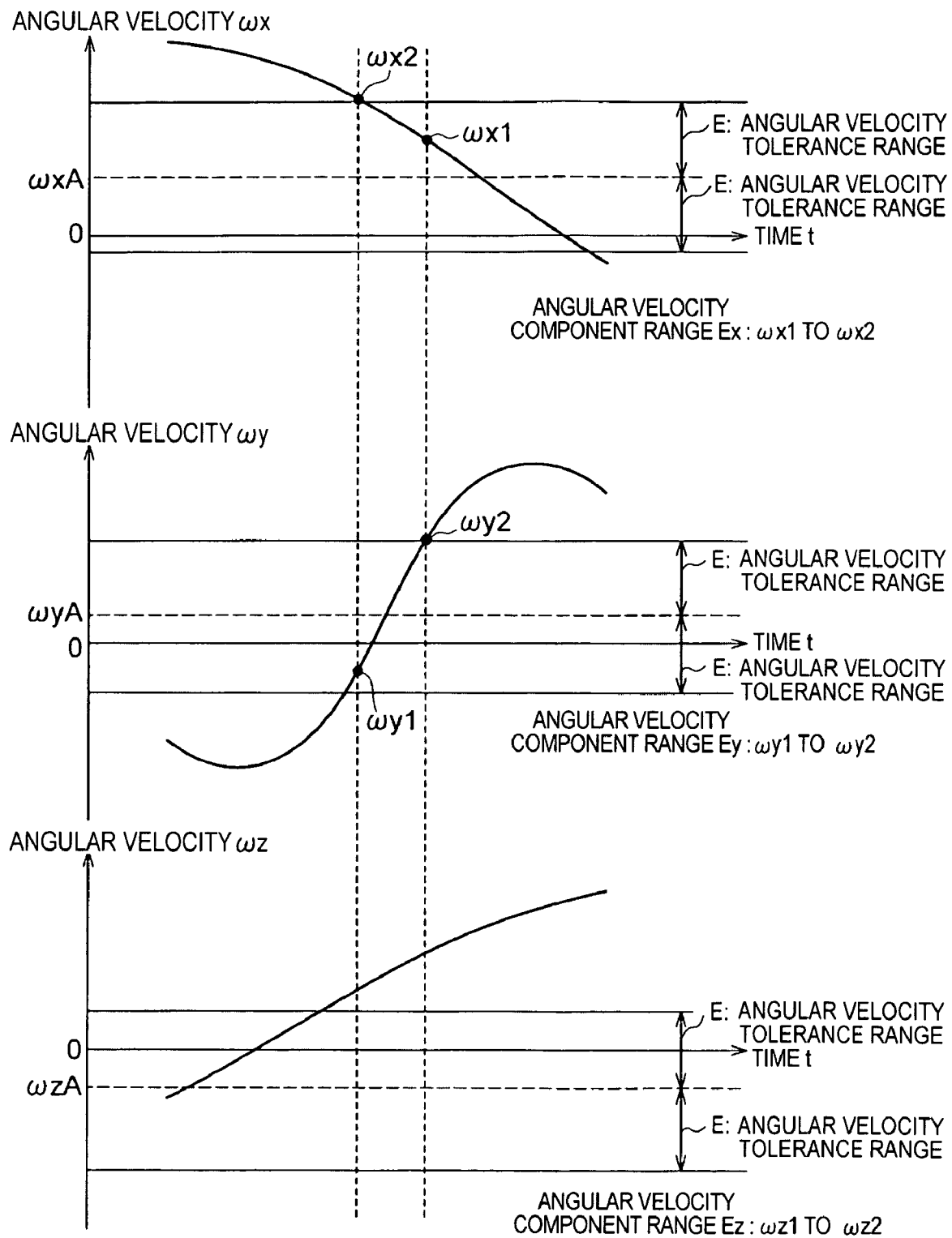
FIG. 14 illustrates the shake tendency based on the sampling angular velocity.

Also, FIG. 14 showing a case in which, of the angular velocities ωx, ωy and ωz sampled before the filming in FIG. 13, with the exception of the angular velocity ωz of the Z axis, the other angular velocities ωx and ωy all lie in the angular velocity tolerance range E, in this case, it becomes the hand shake tendency 105E, and the algorithm 110E is employed. With the algorithm 110E, the angular velocity component ranges Ex and Ey are obtained for the angular velocities ωx and ωy, excepting the angular velocity ωz, and, at the time of the moving image reproduction display, only the frames 70 which have angular velocities ωx and ωy lying in the angular velocity component ranges Ex and Ey are selected and transmitted.

Also, in a case in which, although the result of the sampling before the filming does not apply to the shake tendencies 105A to 105E, the angular velocity ωx and/or ωy has the zero cross point P, it becomes a hand shake tendency 105F, and the algorithm 110F is employed. With the algorithm 110F, the angular velocity ωx or ωy having more zero cross points P is selected, the angular velocity component range Ex or Ey in which the selected angular velocity ωx or ωy lies in the angular velocity tolerance range E is determined and, at the time of the moving image reproduction display, only the frames 70 which have angular velocity ωx or ωy lying in the angular velocity component range Ex or Ey are selected and transmitted.

In the event that the result of the sampling before the filming does not fall into any of the hand shake tendencies 105A to 105F, the algorithm 110G is employed. With the algorithm 110G, with no determination of the selected frame based on the zero cross point P, as with the algorithms 110A to 110F, a concentration range is obtained for each of the angular velocities ωx, ωy and ωz sampled before the filming, the ranges are set as the angular velocity component ranges Ex, Ey and Ez and, at the time of the moving image reproduction display, only the frames 70 which have angular velocities ωx, ωy and ωy lying in the angular velocity component ranges Ex, Ey and Ez are selected and transmitted.

Herein, as shown in the heretofore described equation (1), even in the event that the angle velocity movement amount θ, that is, the angular velocity co, is the same, the shake amount K at that time differs depending on a focal distance L, the larger the focal distance L, the larger the shake amount K. As such, a plurality of stages of the angular velocity tolerance range E corresponding to the focal distance L are set in advance in the portable video camera 1A. As such, when selecting the frame selection algorithm 110 based on the angular velocities ωx, ωy and ωz sampled before the filming, by selecting and using the angular velocity tolerance range E corresponding to the focal distance L, the portable video camera 1A carries out a correction of the angular velocity tolerance range E dependent on the focal distance L.

Next, a more detailed description of the moving image, display process will be given with, as an example, a case in which the portable video camera 1A carries out a live view display of the moving image on the display panel 24 when filming.

Figure 15:
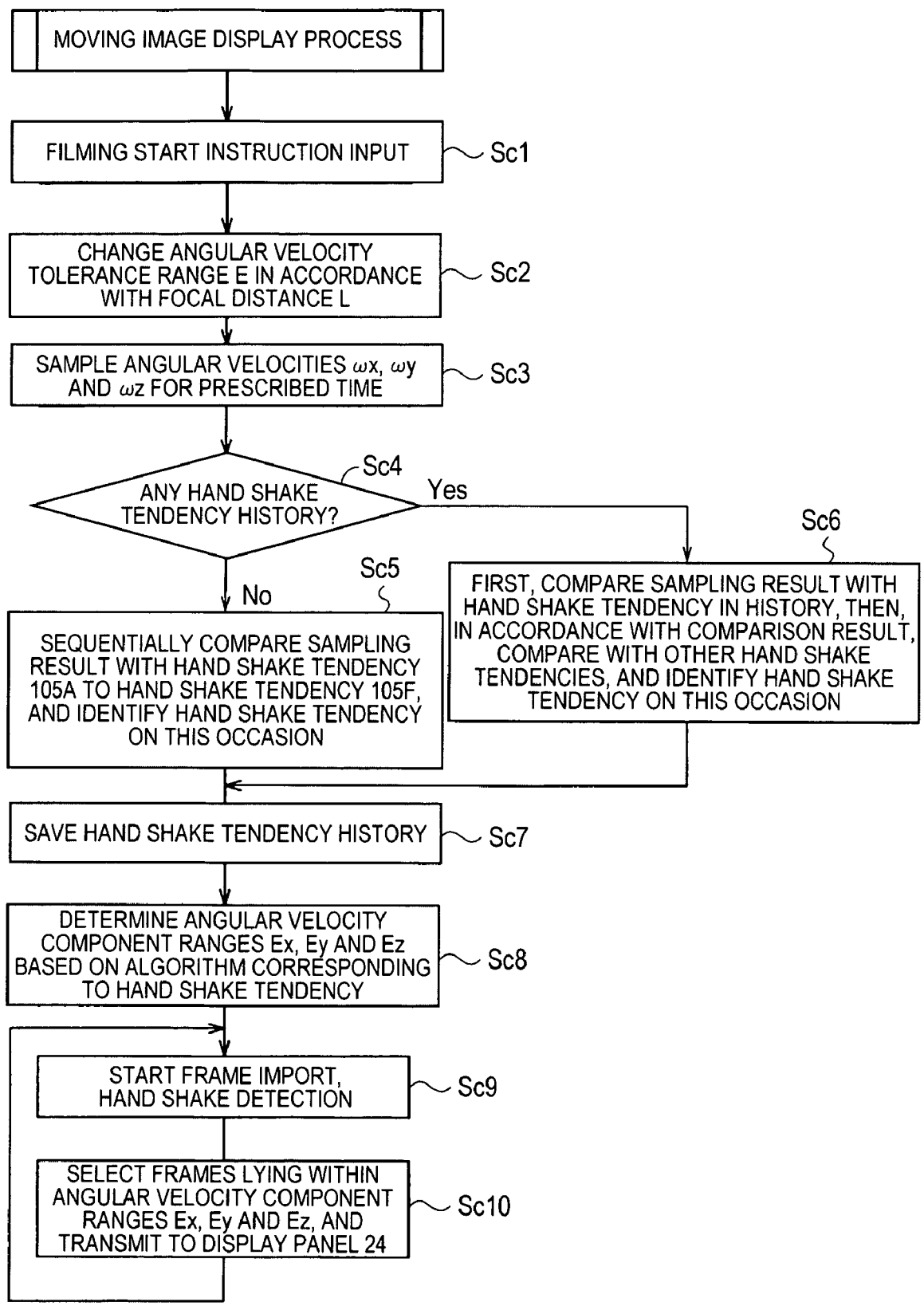
FIG. 15 is a flowchart of a moving image display process.

FIG. 15 is a flowchart of the moving image display process. The moving image display process is started when the filming start instruction is input by the user and is executed continuously until the filming finish instruction is input.

As shown in FIG. 15, upon the filming start instruction being input (step Sc1) and prior to the actual filming but after changing the angular velocity tolerance range E in accordance with a current focal distance L (step Sc2), the controller 10 sequentially receives the angular velocity detection signals transmitted from the angular velocity detector 30A at a prescribed sampling frequency, for a prescribed time, in order to determine the user's hand shake tendency, and stores the angular velocities ωx, ωy and ωz in the RAM 13 (step Sc3).

Next, the controller 10, before identifying the hand shake tendency on this occasion, determines whether or not the hand shake tendency has previously been identified, and an identification result stored in, for example, the flash ROM 12 as a hand shake tendency history (step Sc4). If there is no hand shake tendency history (step Sc4: No), the controller 10, based on a sampling result of the angular velocities ωx, ωy and ωz, determines to which of the heretofore described hand shake tendencies 105A to 105F the hand shake tendency applies, or that it does not apply to any of them (step Sc5). Herein, since there is a tendency for relevant conditions to be sequentially relaxed from the hand shake tendency 105A to the hand shake tendency 105F, in step Sc5, in order to prevent a mistaken determination of the hand shake tendency, the controller 10 compares the sampling result from the hand shake tendency 105A, which has the strictest condition, to the hand shake tendency 105F, which has the laxest condition.

If a result of the determination in step Sc4 is that there is hand shake tendency history (step Sc4: Yes), the controller 10, first, determines whether or not the sampling result on this occasion applies to the previous hand shake tendency stored as the history. Then, if it does apply, since there is a possibility that the sampling result on this occasion applies to a stricter relevant condition, the controller 10 compares the sampling result in an order in which the relevant conditions become stricter than the previous hand shake tendency, and identifies to which of the hand shake tendencies 105A to 105F the hand shake tendency on this occasion applies. Also, if the sampling result on this occasion does not apply to the relevant condition of the previous hand shake tendency stored in the history, the controller 10 compares the sampling result in an order in which the relevant conditions become laxer, and identifies to which of the hand shake tendencies 105A to 105F the hand shake tendency on this occasion applies.

In this way, if there is the hand shake tendency history, since the controller 10 compares the hand shake tendency in the hand shake history with the sampling result, determines whether or not the hand shake tendency on this occasion is the same as the hand shake tendency in the history and, with a determination result as a reference, determines in the order in which the relevant conditions become stricter, or the order in which the relevant conditions become laxer, it is possible to identify the hand shake tendency efficiently in a short time.

Next, the controller 10 saves the hand shake tendency identified in step Sc5 or Sc6 in the ROM 12 as the hand shake tendency history (step Sc7), and determines the angular velocity component ranges Ex, Ey and Ez based on the frame selection algorithm 110 corresponding to the hand shake tendency, and the angular velocity tolerance range E changed in the previously described step Sc2 (step Sc8).

Next, in addition to starting the filming and sequentially importing the frames 70 at a prescribed frame rate, the controller 10 detects the angular velocities ωx, ωy and ωz in synchronization with the importing of the frames 70 (step Sc9). Then, the controller 10 selects frames, of the sequentially imported frames 70, which have angular velocities ωx, ωy and ωz lying in the angular velocity component ranges Ex, Ey and Ez determined in step Sc8, and transmits them to the display panel 24 (step Sc10), and repeats step Sc9 and step Sc10 until the filming finish instruction is input.

Figure 16:
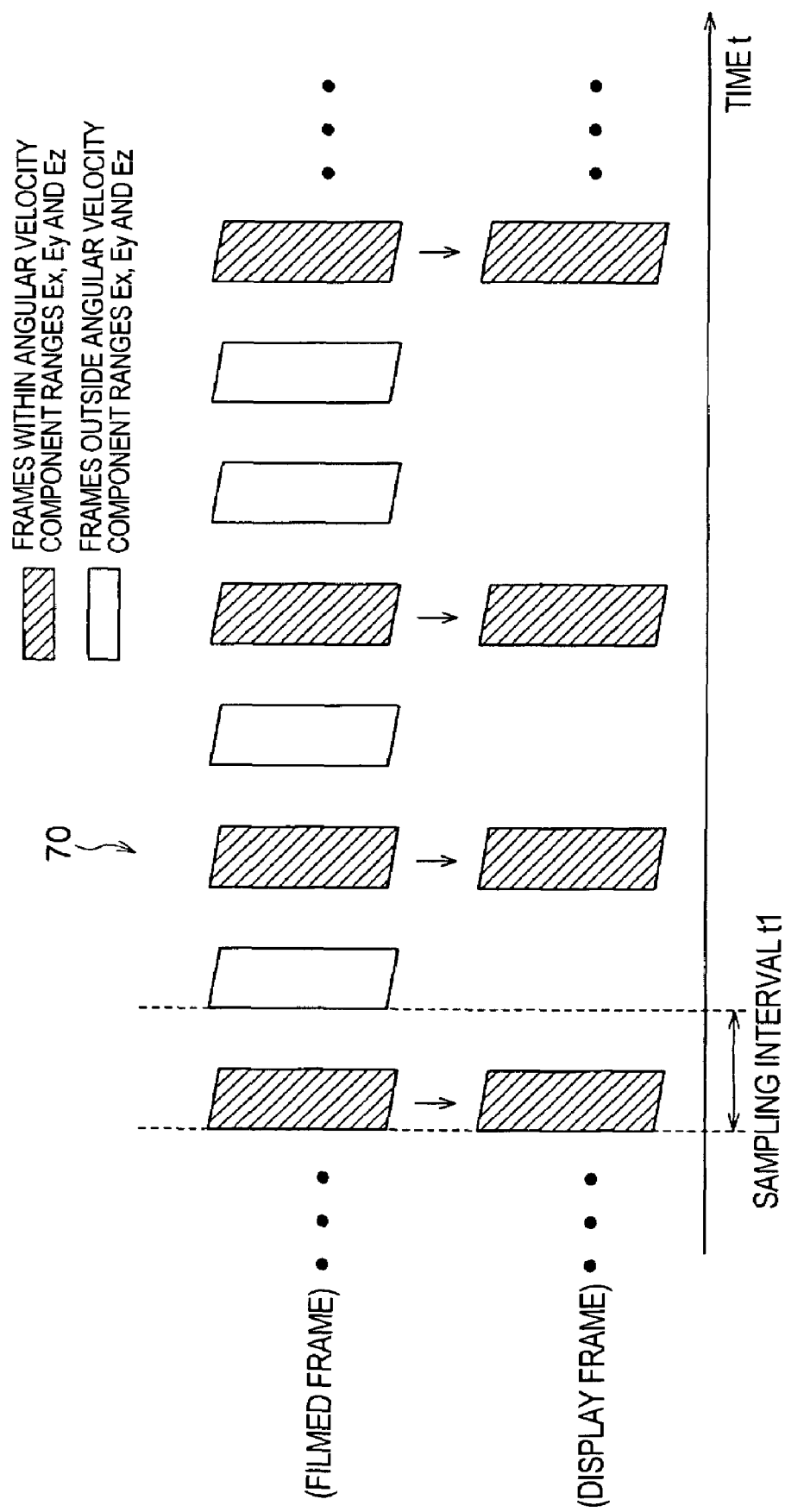
FIG. 16 schematically shows an operation of the second embodiment.

By the heretofore described process, as shown in FIG. 16, the frames 70 which have angular velocities ωx, ωy and ωz lying in the angular velocity component ranges Ex, Ey and Ez, that is, only the frames 70 with no shake, are sequentially selected and transmitted, and the moving image with no shake is displayed.

In the heretofore described moving image display process, in the event that the hand shake tendency on this occasion applies to the hand shake tendency 105A, as it is presumed that no shake will occur among all the filmed frames 70, all the frames 70 are selected and transmitted in step Sc10.

Also, the frames 70 sequentially imported in step Sc9, and the angular velocities ωx, ωy and ωz, being sequentially stored in the removable medium 50 as a moving image file, at a filming finishing time, the moving image file and the frame selection algorithm 110 employed on this occasion are correlated and stored. The portable video camera 1A, after the filming, in a case of reproducing the moving image file, by selecting the frames 70 in accordance with the frame selection algorithm 110 correlated to the moving image file and transmitting them, realizes the moving image reproduction display with no shake.

As heretofore described, according to the portable video, camera 1A according to the embodiment, as the configuration compares the angular velocity of the frames 70 with the angular velocity tolerance range E and selects the frames 70 with no shake, a process such as the determination of the display subject area or the extraction of the display subject area for each frame 70 is unnecessary at the time of the moving image reproduction display. Therefore, even in the event that the sampling rate of the frame 70 is high, it is possible to sufficiently correct shake.

Also, according to the portable video camera 1A according to the embodiment, as the configuration changes the angular velocity tolerance range E in accordance with the focal distance L when filming, even in the event that a zoom changes with each filming, at the time of the moving image reproduction display, it is possible to accurately select and transmit only the frames 70 with no shake appropriate to the zoom.

Furthermore, according to the portable video camera 1A according to the embodiment, as the configuration samples the angular velocity ω for the prescribed time, and changes the angular velocity tolerance range E based on the sampled angular velocity ω, it is possible to appropriately change the angular velocity tolerance range E in accordance with the hand shake tendency at the time of the filming. Furthermore, at the time of the moving image reproduction display, it is possible to accurately select and transmit only the frames 70 with no shake in accordance with the hand shake tendency.

The first and second embodiments described heretofore are merely aspects of the invention and it is possible to alter and apply variations at will within a scope of the invention.

For example, although in each embodiment a configuration which detects the shake amount based on the angular velocity is exemplified, the invention is not limited to this. It is also acceptable to have a configuration which detects the shake amount using an acceleration sensor. Also, it is also acceptable to have a configuration which detects the shake amount by, for example, an image process which calculates a movement amount of a feature point between the frames, and calculates the shake amount of the frames based on the movement amount.

Also for example, although in each embodiment a case is exemplified in which the invention is applied to the portable digital video cameras 1 and 1A which are one type of filming device, it is also possible to apply the invention to, for example, a portable telephone or digital camera which has a moving image filming function, a PDA, a laptop personal computer and the like.

Also, the invention can also be implemented as a moving image display device which has a moving image display function realizable by the portable digital video cameras 1 and 1A executing a correction program 100A. Furthermore, for the purpose of the moving image reproduction display with suppressed shake, it can also be implemented as a shake correction device which, when sequentially transmitting the moving image reproduction frames to the display device, selects and sequentially transmits only the frames 70 positioned within the prescribed range centered on the reference frame position A1, or the frames 70 lying in the angular velocity tolerance range E.

What is claimed is:

1. A filming device, comprising:
a filming unit that imports a plurality of frames of a moving image at a prescribed sampling rate;
an angular velocity detecting unit that detects an angular velocity indicating a shake amount corresponding to each of the plurality of frames in each of three mutually orthogonal axes;
an angular velocity sampling unit that, prior to the importing of the frames by the filming unit, samples the angular velocity detected by the angular velocity detecting unit for a prescribed time in each of the three mutually orthogonal axes;
a tolerance range setting unit that, based on a shake tolerance range, sets an angular velocity tolerance range in each of the three mutually orthogonal axes;
a shake tendency specifying unit that specifies a shake tendency based on the sampled angular velocity and the angular velocity tolerance range;
an algorithm determination unit that determines an algorithm for selecting the frame based on the shake tendency; and
a frame selection and transmission unit that selects frames of the plurality of frames based on the determined algorithm, and that sequentially transmits only the selected frames;
wherein the shake tendency specifying unit specifies:
a first shake tendency when the sampled angular velocities in the three mutually orthogonal axes are zero,
a second shake tendency when all of the sampled angular velocities in the three mutually orthogonal axes are non-zero and the sampled angular velocities in all of the three mutually orthogonal axes are within the angular velocity tolerance range, and
a third shake tendency when all of the sampled angular velocities in the three mutually orthogonal axes are non-zero and the sampled angular velocities in only two of the three mutually orthogonal axes are within the angular velocity tolerance range;
wherein the algorithm determination unit sets the determined algorithm to be:
a first algorithm when the first shake tendency is specified,
a second algorithm when the second shake tendency is specified, and
a third algorithm when the third shake tendency is specified;
wherein the frame selection and transmission unit selects:
all of the plurality of frames, when the first algorithm is set as the determined algorithm,
frames whose corresponding sampled angular velocities are within the angular velocity tolerance range in all of the three mutually orthogonal axes, when the second algorithm is set as the determined algorithm, and frames whose corresponding sampled angular velocities are within the angular velocity tolerance range in two of the three mutually orthogonal axes, when the third algorithm is set as the determined algorithm.

2. A method of operating a filming device, the method comprising:
- importing a plurality of frames of a moving image at a prescribed sampling rate, using a filming unit;
- detecting an angular velocity indicating a shake amount corresponding to each of the plurality of frames in each of three mutually orthogonal axes, using an angular velocity detecting unit;
- prior to importing of the frames, sampling the angular velocity for a prescribed time in each of the three mutually orthogonal axes;
- setting an angular velocity tolerance range in each of the three mutually orthogonal axes based on a shake tolerance range;
- specifying a shake tendency based on the sampled angular velocity and the angular velocity tolerance range, comprising:
  - specifying a first shake tendency when the sampled angular velocities in the three mutually orthogonal axes are zero,
  - specifying a second shake tendency when all of the sampled angular velocities in the three mutually orthogonal axes are non-zero and the sampled angular velocities in all of the three mutually orthogonal axes are within the angular velocity tolerance range, and
  - specifying a third shake tendency when all of the sampled angular velocities in the three mutually orthogonal axes are non-zero and the sampled angular velocities in only two of the three mutually orthogonal axes are within the angular velocity tolerance range;
- determining an algorithm for selecting the frame based on the shake tendency, comprising:
  - determining a first algorithm when the first shake tendency is specified,
  - determining a second algorithm when the second shake tendency is specified, and
  - determining a third algorithm when the third shake tendency is specified;
- selecting frames of the plurality of frames based on the determined algorithm, comprising:
  - selecting all of the plurality of frames, when the first algorithm is set as the determined algorithm,
  - selecting frames whose corresponding sampled angular velocities are within the angular velocity tolerance range in all of the three mutually orthogonal axes, when the second algorithm is set as the determined algorithm, and
  - selecting frames whose corresponding sampled angular velocities are within the angular velocity tolerance range in two of the three mutually orthogonal axes, when the third algorithm is set as the determined algorithm; and
- sequentially transmitting only the selected frames.

3. A computer-readable recording medium storing a computer program to cause a camera to perform the following:
- importing a plurality of frames of a moving image at a prescribed sampling rate, using a filming unit;
- detecting an angular velocity indicating a shake amount corresponding to each of the plurality of frames in each of three mutually orthogonal axes, using an angular velocity detecting unit;
- prior to importing of the frames, sampling the angular velocity for a prescribed time in each of the three mutually orthogonal axes;
- setting an angular velocity tolerance range in each of the three mutual orthogonal axes based on a shake tolerance range;
- specifying a shake tendency based on the sampled angular velocity and the angular velocity tolerance range, comprising:
  - specifying a first shake tendency when the sampled angular velocities in the three mutually orthogonal axes are zero,
  - specifying a second shake tendency when all of the sampled angular velocities in the three mutually orthogonal axes are non-zero and the sampled angular velocities in all of the three mutually orthogonal axes are within the angular velocity tolerance range, and
  - specifying a third shake tendency when all of the sampled angular velocities in the three mutually orthogonal axes are non-zero and the sampled angular velocities in only two of the three mutually orthogonal axes are within the angular velocity tolerance range;
- determining an algorithm for selecting the frame based on the shake tendency, comprising:
  - determining a first algorithm when the first shake tendency is specified,
  - determining a second algorithm when the second shake tendency is specified, and
  - determining a third algorithm when the third shake tendency is specified;
- selecting frames of the plurality of frames based on the determined algorithm, comprising:
  - selecting all of the plurality of frames, when the first algorithm is set as the determined algorithm,
  - selecting frames whose corresponding sampled angular velocities are within the angular velocity tolerance range in all of the three mutually orthogonal axes, when the second algorithm is set as the determined algorithm, and
  - selecting frames whose corresponding sampled angular velocities are within the angular velocity tolerance range in two of the three mutually orthogonal axes, when the third algorithm is set as the determined algorithm; and
- sequentially transmitting only the selected frames.

* * * * *